US012009860B2

(12) United States Patent
Saes et al.

(10) Patent No.: US 12,009,860 B2
(45) Date of Patent: Jun. 11, 2024

(54) LED DRIVER FOR VLC

(71) Applicant: eldoLAB Holding B.V., Son en Breugel (NL)

(72) Inventors: Marc Saes, Eindhoven (NL); Andy Johanna Elisabeth Otten, Wassenberg (DE)

(73) Assignee: eldoLab Holding B.V., Son en Breugel (NL)

( * ) Notice: Subject to any disclaimer, the term of this patent is extended or adjusted under 35 U.S.C. 154(b) by 0 days.

(21) Appl. No.: 17/352,490

(22) Filed: Jun. 21, 2021

(65) Prior Publication Data

US 2022/0263574 A1   Aug. 18, 2022

Related U.S. Application Data

(63) Continuation of application No. 16/482,961, filed as application No. PCT/NL2018/050087 on Feb. 8, 2018, now Pat. No. 11,075,696.

(30) Foreign Application Priority Data

Feb. 8, 2017 (NL) ..................... 2018342
Sep. 26, 2017 (NL) ..................... 2019630

(51) Int. Cl.
*H04B 10/116* (2013.01)
*H05B 45/10* (2020.01)
*H05B 45/20* (2020.01)

(52) U.S. Cl.
CPC ........... *H04B 10/116* (2013.01); *H05B 45/10* (2020.01); *H05B 45/20* (2020.01)

(58) Field of Classification Search
CPC .................. H04B 10/11–116; H05B 45/10–28

(Continued)

(56) References Cited

U.S. PATENT DOCUMENTS 7,689,130 B2 * 3/2010 Ashdown ............. H04B 10/116
                                                    398/118
9,432,116 B2   8/2016 Raj
(Continued)

FOREIGN PATENT DOCUMENTS

WO    2010128845 A2   11/2010
WO    2011/056068 A2   5/2011
(Continued)

OTHER PUBLICATIONS

International Search Report and Written Opinion for International Application No. NL 2018342, dated Oct. 20, 2017.
(Continued)

*Primary Examiner* — Li Liu
(74) *Attorney, Agent, or Firm* — Buchanan Ingersoll & Rooney PC

(57) ABSTRACT

A visual light communication (VLC) method for a lighting system comprising an LED driver and a plurality of LEDs or LED groups includes the steps of: receiving a set-point representing a desired illumination characteristic, comprising an intensity set-point, a color set-point or a combination thereof, and data that is to be transmitted using VLC; determining a current profile for each LED or LED group of the plurality of LEDs or LED groups based on the desired illumination characteristic represented by the set-point, whereby an envelope of a combined current profile is modulated for a corresponding intensity variation as perceived by a sensor to represent a variable length VLC code comprising one or more code words; and generating one or more control signals to drive the plurality of LEDs or LED groups in accordance with the current profiles for the plurality of LEDs or LED groups to transmit the VLC code.

33 Claims, 11 Drawing Sheets

(58) Field of Classification Search
USPC .................................. 398/103, 118–131, 172
See application file for complete search history.

(56) References Cited

U.S. PATENT DOCUMENTS

| | | | | |
|---|---|---|---|---|
| 2010/0034540 | A1* | 2/2010 | Togashi ................... | H04N 7/22 |
| | | | | 398/118 |
| 2010/0247112 | A1* | 9/2010 | Chang ................. | H04B 10/116 |
| | | | | 398/182 |
| 2012/0275796 | A1* | 11/2012 | Yokoi ................ | H04B 10/1141 |
| | | | | 398/118 |
| 2013/0308955 | A1* | 11/2013 | Walewski ............... | H03M 7/16 |
| | | | | 398/118 |
| 2015/0147069 | A1* | 5/2015 | Brandt-Pearce .... | H04L 25/4902 |
| | | | | 398/186 |
| 2015/0377695 | A1* | 12/2015 | Chang ................... | G01J 1/0252 |
| | | | | 250/208.2 |
| 2016/0112125 | A1* | 4/2016 | Yokoi ................. | H04B 10/116 |
| | | | | 398/118 |
| 2016/0323035 | A1* | 11/2016 | Jovicic ................ | H04B 10/116 |

FOREIGN PATENT DOCUMENTS

| | | | | |
|---|---|---|---|---|
| WO | 2012/033410 | A2 | 3/2012 | |
| WO | 2015/199538 | A1 | 12/2015 | |
| WO | WO2015199538 | * | 12/2015 | ............. H05B 37/02 |

OTHER PUBLICATIONS

International Search Report for International Application No. PCT/NL2018/050087, dated Jul. 30, 2018.

\* cited by examiner

LED DRIVER FOR VLC

CROSS REFERENCE TO RELATED APPLICATIONS

This application is a Continuation Application of U.S. application Ser. No. 16/482,961, filed Aug. 1, 2019, now allowed, which is a U.S. National Phase Patent Application of International Application No. PCT/NL2018/050087, filed Feb. 8, 2018, which claims priority to Netherlands Application No. NL 2018342, filed Feb. 8, 2017, and Netherlands Application No. NL 2019630, filed Sep. 26, 2017, the disclosures of which are entirely incorporated herein by reference.

FIELD OF THE INVENTION

The invention relates to the field of light applications, in particular to LED-based lighting applications that are applied for visual light communication (VLC).

BACKGROUND OF THE INVENTION

The present invention relates to visible or visual light communication (VLC) as may be applied by LED based lighting applications. In general, communication by means of visual light may be realized in various manners, using different modulation schemes to code the information that is to be communicated. LED based lighting applications in general allow for a high quality illumination experience, e.g. having variable color functionality and dimming functionality. In addition, there are additional demands that have to be met, e.g. with respect to flicker. Such a combination of demands may not always be met. In particular, it may be difficult to maintain a broadcasting using VLC while an illumination set-point is adjusted. Or, it may be difficult to maintain a broadcasting using VLC substantially flicker-free. It may further be desired to increase the amount of information or data that can be broadcasted using VLC per unit of time.

It is an object of the present invention to provide in control methods for LED based lighting applications which provide in an improved realization of the various demands.

SUMMARY OF THE INVENTION

It would be desirable to provide in an LED driver enabling to more accurately operate in a VLC mode during a transient such as an illumination characteristic transient. It would also be desirable to provide in an LED driver enabling to maintain operating in a VLC mode during various circumstances. It would also be desirable to increase the amount of information or data that can be broadcasted using VLC per unit of time.

To address these concerns, in a first aspect of the invention, an LED driver is provided, the LED driving being configured to drive a plurality of LEDs or LED groups to transmit light in a VLC mode, wherein the LED driver comprises a control unit that is configured to:

receive, at an input terminal, a set-point representing a desired illumination characteristic and data that is to be transmitted using VLC;

determining a current profile for each LED or LED group of the plurality of LEDs or LED groups based on the desired illumination characteristic represented by the set-point, whereby an envelope of a combined current profile of the current profiles is modulated in order for a corresponding intensity variation as perceived by a sensor to represent a variable length VLC code representing the data, the VLC code comprising one or more code words, a code word comprising a plurality of symbols, whereby each of the plurality of symbols is characterized by a respective predetermined period;

generate one or more control signals to drive the plurality of LEDs or LED groups in accordance with the current profiles in order for the plurality of LEDs or LED groups to transmit the VLC code.

This first aspect may also be embodied in a visual light communication (VLC) method for a lighting system comprising an LED driver and a plurality of LEDs or LED groups, the method comprising the steps of:

receiving a set-point representing a desired illumination characteristic and data that is to be transmitted using VLC; and determining a current profile for each LED or LED group of the plurality of LEDs or LED groups based on the desired illumination characteristic represented by the set-point, whereby an envelope of a combined current profile of the current profiles is modulated in order for a corresponding intensity variation as perceived by a sensor to represent a variable length VLC code representing the data, the VLC code comprising one or more code words, a code word comprising a plurality of symbols, whereby each of the plurality of symbols is characterized by a respective predetermined period;

generating one or more control signals to drive the plurality of LEDs or LED groups in accordance with the current profiles in order for the plurality of LEDs or LED groups to transmit the VLC code.

In accordance with the first aspect of the present invention, an LED driver is provided for driving a plurality of LEDs or LED groups. In an embodiment, the LEDs or LED groups may e.g. have different illumination characteristics such as a different color.

As an example, the plurality of LEDs or LED groups may comprises one or more warm white LEDs constituting a first group and one or more cold white LEDs constituting a second group.

In an embodiment, the LED driver comprises one or more power converter for supplying power to the LEDs or LED groups. Such power converters may e.g. comprise switched mode power converters such as Buck or Boost converters which may be configured to generate a controlled output current in accordance with a control signal as received from a control unit of the LED driver. Such a control unit may e.g. comprise one or more processors or microcontrollers or the like, an input terminal for receiving input signals representing a desired illumination characteristic to be generated by the plurality of LEDs or LED groups and an output terminal for outputting control signals for a power converter of the LED driver.

In an embodiment, the control unit may further be configured to receive data or information that is to be transmitted by means of VLC by the LEDs or LED groups. Such data or information may also be received via the input terminal or may be received via a dedicated data terminal of the control unit of the LED driver.

In accordance with the present invention, the LED driver is configured to drive the LEDs so as to generate a variable length VLC code, whereby code words, representing the data or information that is to be transmitted, are transmitted by means of a modulation of the overall intensity of the LEDs or LED groups. More details on such a code are provided below.

In order to generate such a VLC code, the control unit of the LED driver according to the first aspect of the present invention is configured to determine, e.g. based on a set-point representing a desired illumination, a required current profile for each of the plurality of LEDs or LED groups to generate the desired illumination characteristic, whereby an envelope of the combined current profile, i.e. the combination of the current profiles of the plurality of LEDs or LED groups, comprises a modulation in order for a corresponding intensity modulation as perceived by a sensor to represent a variable length VLC code representing the data. The control unit may thus determine current profiles for the LEDs or LED groups, such that, when these current profiles are applied, an intensity modulation is obtained which can be perceived by a sensor. Further, in an embodiment, the current profiles are determined in such manner, that, on average, the illumination as generated by the LEDs or LED groups corresponds to the desired illumination characteristic.

Within the meaning of the present invention, a desired illumination characteristic may refer to a desired intensity, a desired color or the combination of a desired color and intensity of the light source, i.e. the plurality of LEDs or LED groups.

In accordance with the present invention, the desired illumination may be represented by a set-point, e.g. an intensity set-point, a color set-point or a combination thereof.

In an embodiment of the present invention, the modulation as applied to the combined current profile, i.e. the modulation corresponding to the envelope of the combined current profile is such that both the desired intensity and the desired color are maintained during the VLC transmission. This can be realized in various manners:

A first manner to maintain both color and intensity is to select or construct the current profiles of the plurality of LEDs or LED groups in such manner that the average intensity and average color as generated during the transmission of each symbol correspond to the desired intensity and color.

A second manner to maintain both color and intensity is to select or construct the current profiles of the plurality of LEDs or LED groups in such manner that the average intensity and average color as generated during the transmission of each code word correspond to the desired intensity and color. This second manner enables a more flexible manner to select or construct the current profiles, since there is no need to match the generated color and intensity for each symbol; rather, it is sufficient to match the average intensity and color as generated during the transmission of a code word with the desired intensity and color.

Depending on the length of the code words as transmitted, it may even be possible to only match the average intensity and color as generated during the transmission of multiple code words with the desired intensity and color. When code words are sufficiently short, it may be sufficient that the average intensity and color as generated during the transmission of two or more code words corresponds to the desired intensity and color, without an observer noticing the intensity or color variation during the transmission of the two or more code words.

In an embodiment of the present invention, a symbol as transmitted is not only characterized by its duration or period, but also by a color or color characteristic applied during the transmission. By characterizing a symbol by both a particular duration or period and a color or color characteristic, a much larger number of distinguishable symbols may be generated, enabling the transmission of an increased amount of data or information per unit of time.

In such an embodiment, a receiver (e.g. a smartphone, tablet, laptop, computer or the like) may be configured to both assess an intensity, in particular a variation of the intensity over time in accordance with the envelope of the combined current profile as applied to the plurality of LEDs or LED groups, and a color of the transmitted symbols and code words.

Regarding the feature color or color characteristic as applied for the transmission of a symbol or code word, various options may be applied.

In a first embodiment, the color associated with the transmission of a symbol or code word can be defined as the average color as observed by a receiver during said transmission. As an example, when a code word consisting of four symbols is transmitted using only red LEDs, this code word may be given a particular meaning. When the same code word is transmitted using only Blue LEDs, the code word may have a different meaning. When the same code word is transmitted using Red LEDs for the first two symbols and using Blue LEDs for the last two symbols, it may have yet another meaning. Also, when a code word or symbol is transmitted with an average color which is a particular, predefined mixture of the available Red and Blue light, the code word or symbol may have yet another meaning. As will be understood by the skilled person, by distinguishing between symbols or code words based on both duration and color, one obtains a larges set of possible symbols or code words, which enables to increase the information density that can be transmitted per unit of time.

In a second embodiment, a distinction between symbols having the same length is made based on which LED or LED group is used to generate the modulation in the envelope of the combined current profile. Assuming a light source as controlled by an LED driver comprises a Blue LED and a Red LED, one may either, in order to generate a modulated current profile of which the symbol periods or durations can be detected by a receiver, modulate the light as generated by the Blue LED, or modulate the light as generated by the Red LED, or modulate the light as generated by both the Red LED and the Blue LED. These three different scenario's can be considered to represent three different symbols, while the period of duration of the symbols are the same. This second embodiment thus also enables to improve the information density that can be transmitted per unit of time.

As will be understood by the skilled person, in case the color or a color characteristic is also used to characterize a particular symbol or code word, they would in general be a mismatch between the desired color, i.e. the color as requested by a user and e.g. represented by a color set point, and the color as applied during the transmission of the VLC code. In order to overcome or mitigate this mismatch, various options exist.

As a first option, the transmission of a code word using a particular color or color characteristic may be followed by a period during which there is no VLC transmission and during which, the color mismatch is compensated or mitigated. Depending on the length or duration of a code word or code words and depending on the required compensation, such a compensation may take place after every code word or after a plurality of code words, e.g. after every two or three or more code words are transmitted.

As a second option, rather than defining a different symbol for every different color or for every color range available for a particular light source, one may e.g. choose two or more different colors to represent the same symbol.

By doing so, one may, when such a symbol needs to be transmitted, select the most appropriate color out of the different colors that represent the symbol, the most appropriate color e.g. being closest to the desired color as defined by the color set point or the most appropriate color based on an average color as determined or generated so far, i.e. up to the instant when the symbol needs to be transmitted. More detailed embodiments will be discussed further on.

With respect to modulations in intensity and color, as may be applied during the transmission of a VLC code, it can be noted that, in general, by ensuring that the intensity modulation occurs on a comparatively high frequency, e.g. above 250 or 300 Hz, the modulation will not be noticed by an observer, rather, the observer will perceive the mixed, i.e. the averaged intensity of the LEDs or LED groups. The same holds for modulations or variations in the applied color. It has however been observed that color variations may occur at lower frequencies before they are noticed by an observer.

In accordance with the present invention, the control unit of the LED driver according to the first aspect of the present invention is further configured to generate one or more control signals to drive the plurality of LEDs in accordance with the current profiles in order for the plurality of LEDs or LED groups to transmit the VLC code. These control signals may e.g. be provided to the one or more power converters of the LED driver.

In accordance with an embodiment of the present invention, the control unit of the LED driver is further configured to ensure that a transmission of a VLC code, e.g. representing data or information, is not interrupted or disturbed, when an illumination characteristic of the LEDs or LED groups is altered or to be altered. In particular, in an embodiment of the present invention, the control unit of the LED driver according to the present invention is configured to, upon receipt of a further set-point representing a different, desired illumination characteristic, only gradually implement this new illumination characteristic when a VLC code is transmitted.

In such embodiment, the control unit of the LED driver according to the present invention may be configured to perform the following steps:
  upon receipt of a further set-point representing a different illumination characteristic during the transmission of the VLC code, determine an adjusted current profile or profiles for one or more LEDs or LED groups of the plurality of LEDs or LED groups based on the different illumination characteristic, whereby the current profile is only adjusted for some, not all, symbols of a next code word to be transmitted;
  generate one or more control signals to drive the plurality of LEDs or LED groups in accordance with the adjusted current profile or profiles, and
  output, via an output terminal of the control unit, one or more control signals to drive the plurality of LEDs or LED groups in accordance with the adjusted current profile or profiles.

In an embodiment, such a gradual implementation is realized by determining an adjusted current profile for one or more of the LEDs or LED groups, based on the different desired illumination characteristic, whereby only some of the symbols in a next code word that is to be transmitted take account of the new illumination characteristic. As such, a transition from a first illumination characteristic, e.g. represented by a first desired color and intensity of the LEDs or groups of LEDs to a second illumination characteristic, e.g. represented by a second desired color and intensity of the LEDs or LED groups is introduced in multiple steps.

As an example, the control unit of the LED driver may e.g. be configured to:
  in a first step, determine current profiles for transmitting a code word comprising multiple symbols based in the first illumination characteristic;
  in a second step, determine one or more adjusted current profiles for transmitting a second code word comprising multiple symbols based on the second illumination characteristic, whereby the some, but not all symbols of the second code word take the second illumination characteristic into account;
  in third step, determine one or more further adjusted current profiles for transmitting a third code word comprising multiple symbols based on the second illumination characteristic, whereby the further adjusted current profiles result, when applied to the LEDs or LED groups, in the second illumination characteristic.

In an alternative embodiment, rather than only applying an adjusted current profile to only some of the symbols of a next code word that is to be transmitted, a desired transition between a first illumination set-point or characteristic and a second illumination set-point or characteristic can be gradually introduced by applying one or more intermediate current profiles to a sequence of code words.

In such arrangement, a control unit as applied in an LED driver according to the present invention may be configured to, after receiving a first illumination characteristic and determining the corresponding current profiles to realize this illumination characteristic:
  receive a further set-point representing a different second illumination characteristic;
  determine a further current profile for one or more of the plurality of LEDs to generate the different second illumination characteristic represented by the further set-point,
  determine one or more intermediate current profiles for one or more of the plurality of LEDs, and
  determine output control signals for the LED driver to sequentially drive the plurality of LEDs or LED groups according to:
  the current profiles when transmitting a first code word;
  the one or more intermediate current profiles, when transmitting a respective one or more further code words, and
  the further current profiles when transmitting a yet further code word.

In an embodiment, the intermediate current profiles may e.g. represent illumination characteristics that are combinations of the first and second illumination characteristics.

As an example, the first illumination set-point may e.g. be to operate a first LED group at 50% and the second LED group at 50%, whereas the second illumination set-point may e.g. be to operate a first LED group at 70% and the second LED group at 30%.

In such example, the control unit may e.g. be configured to determine and sequentially apply:
  current profiles corresponding to operate a first LED group at 50% and the second LED group at 50% when transmitting a first code word;
  current profiles corresponding to operate a first LED group at 60% and the second LED group at 40% when transmitting a second code word;
  current profiles corresponding to operate a first LED group at 70% and the second LED group at 30% when transmitting a third code word.

In such embodiment, the control unit may thus implement one or more intermediate illumination set-point, e.g. obtained by linear interpolation between a first set-point and a second set-point, thereby obtaining a gradual transition between two set-points, during a VLC code transmission.

It may further be pointed out that during a transition from a first illumination set point and a second illumination set point the step of determining one or more intermediate current profiles should take account of whether a symbol or code word is only characterized by a predetermined duration or period, or is also characterized by its color.

In an embodiment of the present invention, the control unit as applied in the LED driver according to the present invention is configured to substantially maintain a modulation depth during the operation in VLC mode when an illumination characteristic is adjusted.

In an embodiment, the frequency content of the current profiles as applied during the transition from a first illumination set-point to a second illumination set-point is kept above a predetermined value. In particular, in an embodiment, the adjusted current profiles or intermediate current profiles are constructed to have a lowest frequency that is equal to or higher than a lowest frequency of the current profiles.

In accordance with a second aspect of the present invention, there is provided a visual light communication method for a lighting system comprising an LED driver and a plurality of LEDs or LED groups, the method comprising the steps of:
- receiving a set-point representing a desired illumination characteristic and data that is to be transmitted using VLC; and
- determining a current profile for each of the plurality of LEDs or LED groups based on the desired illumination characteristic represented by the set-point, whereby an envelope of a combined current profile of the current profiles is modulated in order for a corresponding intensity variation as perceived by a sensor to represent a variable length VLC code representing the data, the VLC code comprising one or more code words, a code word comprising a plurality of symbols, whereby each of the plurality of symbols is characterized by a respective predetermined period, the combined current profile having a high current period and a low current period during each predetermined period, and wherein the combined current profile comprises, during the high current period or the low current period of at least one of the predetermined periods characterizing a symbol, a current increment during a current increment period that is less than the high current period or the low current period.

Within the meaning of the present invention, a period or predetermined period refers to a duration in the time domain, i.e. a length or portion of time.

Within the meaning of the present invention, a current increment refers to an incremental increase or decrease of a supplied current to an LED or LED group during a specified period, whereby incremental increase or decrease refers to a transition between two consecutive available current levels.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
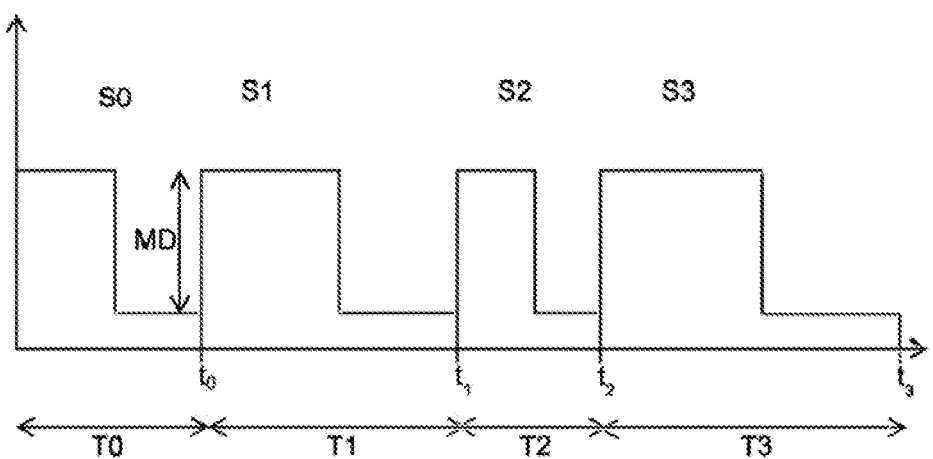
FIG. 1 depicts a current profile representing symbols to be used in a variable length VLC method.

FIG. 1 depicts a current profile which can be applied by an LED driver for transmitting a code or code word using VLC (visible light communication) in accordance with an aspect of the present invention. In general, a VLC scheme applies a plurality of different symbols, e.g. 4-10, which can be combined into code words, each code word consisting of a combination of a predefined set of symbols. In such a VLC scheme, each symbol is represented by a particular current modulation, which may result in a modulated intensity when applied, which intensity variation may be detected by a sensor. Known examples of such modulation are on-off keying (OOK) and pulse position modulation (PPM). In the current profile as shown, a code word or code that is to be communicated consists of a combination of multiple symbols, whereby the symbols that are used have a different length. In the example as shown, 4 symbols S0-S3 are shown, each having a different duration or period T0-T3. In the example as shown, the current profile of each symbol has a first period, also referred to as the high current period, during which the current is comparatively high, followed by the second period, also referred to as the low current period, during which the current is comparatively low. As a result, a receiver having a light sensor may be capable, based on the intensity variations observed, to determine the instants t0-t3 when the symbols start and end and thus, based on the periods between these instants, identify the symbols and thus the code word that is transmitted. In particular, a receiver capable of determining the duration between two consecutive instants at which the intensity increases, would be capable to identify the symbols, based on the determined duration. In order to ensure proper detection of the instants that define the length of the symbols, a sufficient increase in intensity should be applied. In the present invention, the difference between the current at the end of a symbol and the current at the beginning of a next symbol may be referred to as the modulation depth MD. It may be a measure indicative of the ease or accuracy with which the instants t0-t3 may be determined. In case the modulation depth MD is too small, it may be difficult for a receiver or sensor to notice the intensity change.

In a practical implementation, periods T0-T3 of the symbols may e.g. be in a range between 200 μsec and 500 μsec, whereas the duration or period of a code word is e.g. smaller than or equal to 3 ms or 3.33 ms.

Figure 2:
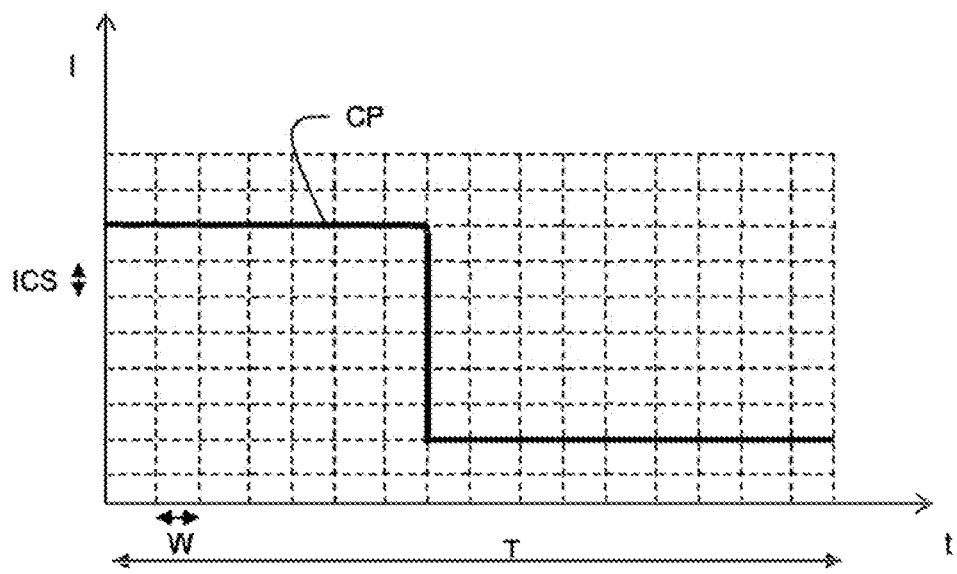
FIG. 2 depicts a detailed current profile of a symbol to be used in a variable length VLC method.

With respect to the implementation of a VLC scheme, it may further be important to point out that, in general, the instants at which the current level may be adjusted are fixed, e.g. fixed relative to a clock frequency. As an example, the clock frequency can be such that a new set-point can only be applied upon expiring of a minimal predetermined period. This minimal period may e.g. be referred to as the incremental period, or clock period, W (see FIG. 2) and may be in a range between 20 μsec and 30 μsec, e.g. 26 μsec. As such, the length or period of the particular symbols S0-S3 as used in the coding will typically be a multiple of the incremental period W, e.g. S0=10×W, S1=14×W, S2=18×W, S3=22×W. In addition, the amplitude of the current I as shown in the current profile will typically also be adjustable in a discrete manner, rather than a continuous manner. In particular, as shown in FIG. 2, the smallest adjustment that can be applied to the current is the distance between two adjacent horizontal dotted lines, this smallest current increment being referred to, in the present invention, as the incremental current step ICS. Or, phrased differently, an incremental increase or decrease of a supplied current to an LED or LED group refers to a transition between two consecutive available current levels.

FIG. 2 schematically shows a current profile CP representing a particular symbol, the symbol being represented or identifiable by means of the period T of the symbol. In FIG. 2, the vertical dotted lines indicate instants at which the current I can be changed, the horizontal dotted lines indicate possible amplitudes of the current I.

In such an arrangement, an increase or decrease of the current I can only occur along the dotted lines.

In case a current profile as shown in FIG. 1 or 2 is used to transmit information, it will be clear that this current profile will correspond to a certain illumination intensity. In order to avoid the modulation of the current to be perceived by an observer, the periods of the different symbols or the overall period of a code word should be selected to be comparatively low, such that the frequency content of the current profile is comparatively high. As an example, the periods of the symbols used can be selected in such manner that the overall length or period of a code word is less than or equal to a predetermined value, e.g. 3.3 msec.

In addition to a desired intensity, an illumination set-point may further include a desired color to be generated by the light source, the light source e.g. comprising a plurality of LEDs emitting light of a different frequency or frequency spectrum. The color of the illumination as perceived by an observer can be adjusted by adjusting the relative intensity of the plurality of LEDs applied.

In case various LEDs of different color are applied in an LED fixture, VLC may still be implemented in a similar manner as described above. In particular, when differently colored LEDs, or at least some of the LEDs, are provided with a modulated current, the envelope of the overall current profile can be used to represent the desired symbols forming a code word. In such case, the overall, or combined current profile will result in an overall intensity variation which may be perceived by an optical sensor. In order to realize this, a synchronization of the modulation applied to the different LEDs may be required.

Figure 3:
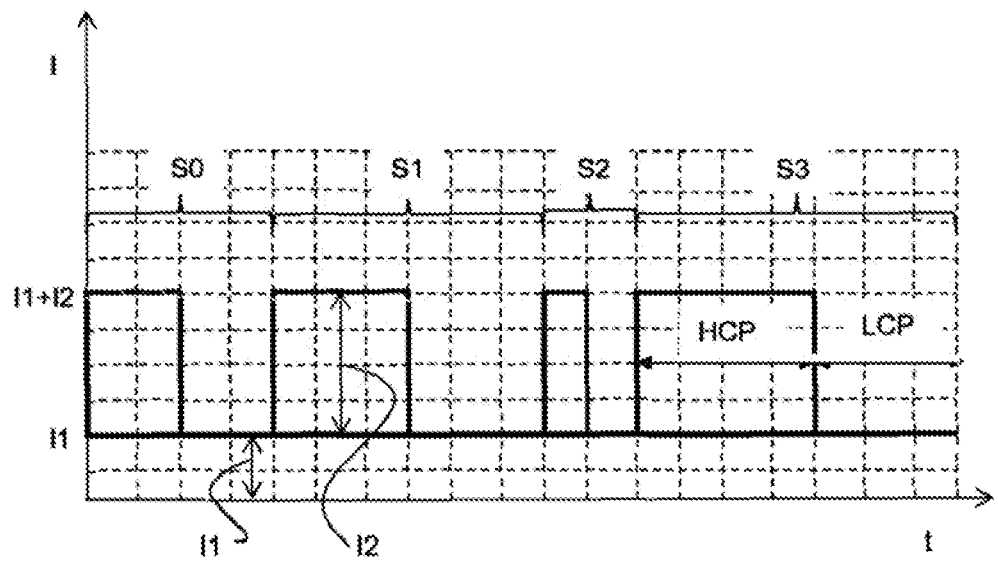
FIGS. 3 and 4a depict two possible current profiles for a first and second LED or LED group representing symbols to be used in a variable length VLC method.

FIG. 3 schematically shows current profiles applied to a first and a second LED and the combined current profile. As shown, the current profile of the first LED, I1, is a continuous current with amplitude I1, the current profile of the second LED, I2 is a modulated current. Combined, the envelope of the current profile resembles the current profile of FIG. 1; i.e. the combined current profile may be considered to represent the required current modulation for broadcasting four symbols S0, S1, S2, S3. Note that, in line with FIG. 2, the current amplitude for both the first LED and the second LED are modulated in accordance with discrete values, as are the instants where the current amplitude can be adjusted. In case the depicted current profiles are applied in a first and a second LED, a sensor observing the light generated by the combined current profile will be able to determine the instants at which the amplitude of the current envelope changes (i.e. increase from a value I1 to a value I1+I2, and thus the symbols that are communicated via the modulation.

Figure 4A:
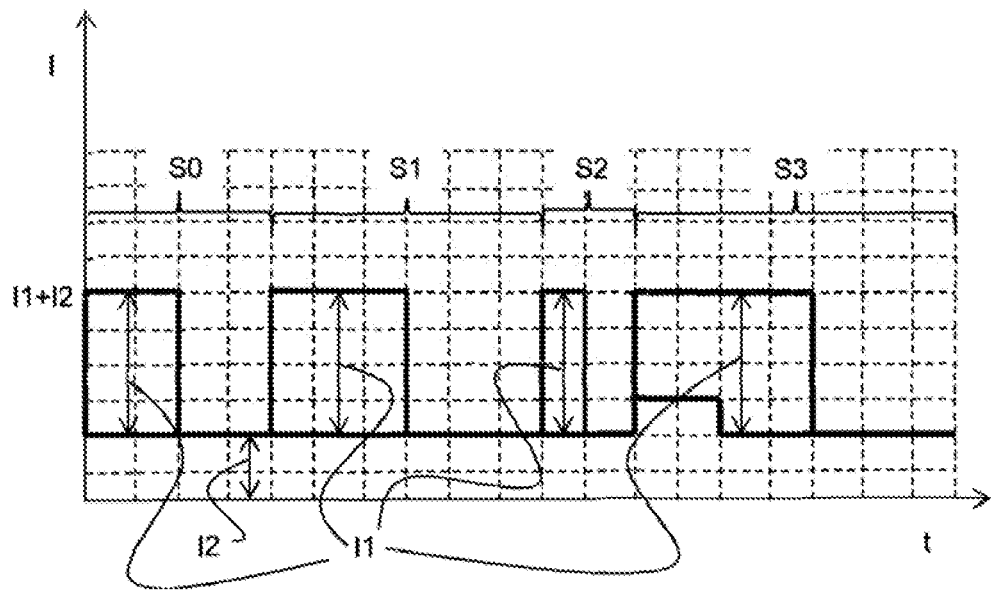

As will be understood by the skilled person, the color and intensity set-point as obtained by the current profiles shown in FIG. 3, may be obtained using alternative current modulations. FIG. 4a schematically shows an alternative manner to arrive at the same combined current envelope using alternative modulations of the currents I1 and I2, both the alternative modulation of FIG. 4a and the modulation shown in FIG. 3 resulting in the same intensity and color experience for an observer. In this respect, it is assumed that there is a linear relationship between the current and the intensity.

With respect to realizing a particular illumination characteristic or set-point, i.e. characterized by both a color set-point and an intensity set-point, it can be pointed out that, depending on the period or duration of a symbol or code word, the realization of a desired intensity and color may be realized per symbol, per code word or per multiple code word.

With respect to the sensing of the VLC, it can however be pointed out that, although the modulation depth of the current modulations shown in FIGS. 3 and 4a is the same, there may be a preferred manner to modulate the currents I1 and I2, e.g. to take into account that a sensor or detector that is used to detect the intensity changes may have a different sensitivity for different wavelengths.

In an embodiment of the present invention, the symbols as used to form a code word are only characterized by their duration or period, e.g. periods T0-T3 in FIG. 1. In such embodiment, the applied color during the transmission may be selected at will, e.g. corresponding to the desired color as represented by a color set point of an illumination set point.

In another embodiment, a symbol as transmitted is not only characterized by its duration or period, but also by a color or color characteristic applied during the transmission. By characterizing a symbol by both a particular duration or period and a color or color characteristic, a much larger number of distinguishable symbols may be generated, enabling the transmission of an increased amount of data or information per unit of time.

Various options exist to define a symbol by its color or a color characteristic as applied during the transmission. This may e.g. be illustrated by reference to FIG. 4b.

Figure 4B:
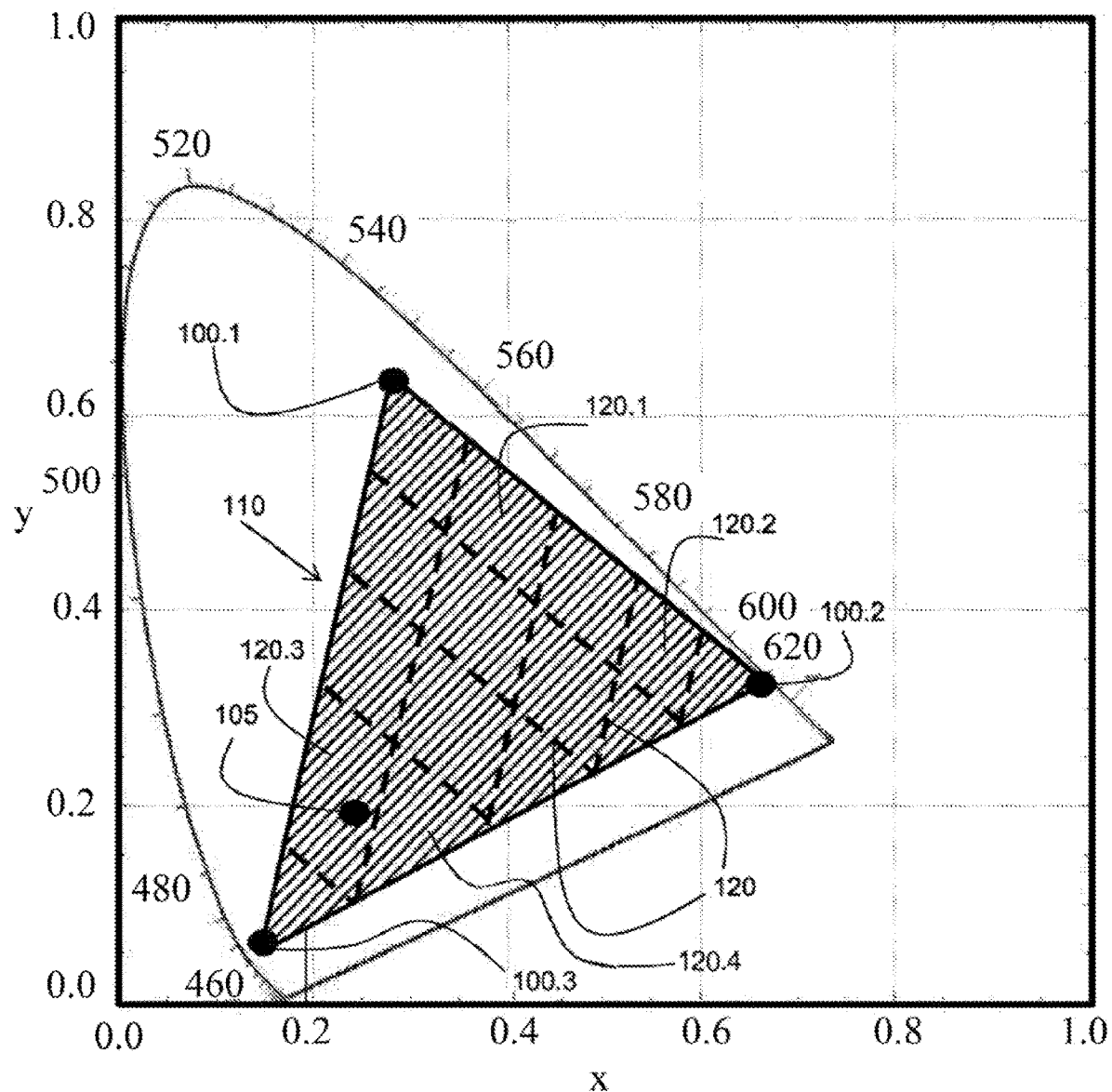
FIGS. 4b and 4c schematically depict CEI diagrams to illustrate visual light communication methods according to the present invention.

FIG. 4b schematically shows a CEI chromaticity diagram and positions of three LEDs 100.1, 100.2 and 100.3 of a light source in said diagram.

As will be understood by the skilled person, by proper control of the intensities generated by the three LEDs, one may generate substantially any color within the indicated triangle 110, e.g. color 105 as indicated.

As a first example how to characterize a symbol by a color (apart from the period or duration) is to use the available colors (100.1, 100.2 and 100.3). by doing so, the number of distinct symbols that can be transmitted has tripled.

As a second example, the available color space, i.e. the area covered by the triangle 110, can be subdivided into different areas. In FIG. 4b, the different areas are defined/bound by the dotted lines 120. By doing so, one can e.g. characterize a symbol by both its period or duration and its position in the CEI diagram. In particular, each area as defined by the dotted lines 120, e.g. areas 120.1 or 120.2 can be used to distinguish between symbols. A symbol having a duration T0 which is transmitted with an average color within area 120.1 may thus be distinguished from a symbol having a duration T0 with an average color within the area 120.2. It may be pointed out that the degree with which one may subdivide the available color space 110 to distinguish symbols should also take into account the possibility of a receiver to distinguish between different colors.

Using this approach, the available number of symbols may be increased significantly, thus increasing the amount of information or data that can be transmitted per unit of time.

It may also be noted that the above may also be applied on a code word level. In a similar manner as defining a symbol by the average color applied during the transmission of the symbol, one may also give a different meaning to code words, depending on the average color applied during their transmission.

When characterizing a symbol or code word to be transmitted by both its duration and color, it will be apparent to the skilled person that this color will often deviate from the desired color, e.g. color 105. When this occurs, a color compensation scheme or method may be applied in the visible communication method according to the present invention.

As an example, assume that a plurality of code words, each comprising multiple symbols, are to be transmitted using colors within the areas 120.1 and 120.2 and, at the same time, the desired color set point corresponds to the color indicated by reference number 105.

In such example, as will be understood by the skilled person, the transmission of the symbols and code words will be primarily obtained by using the LEDs 100.1 and 100.2, whereas, in order to generate color 105, LED 100.3 would have to be applied the most.

In order to arrive, on average, at a desired color, a color compensation scheme may e.g. comprise interrupting the VLC process after each code word or N code words and applying, during a predetermined period (which may e.g. depend on the duration of the VLC transmission and the color applied during said transmission) a different color. During such idle time, i.e. when no VLC code is transmitted, the currents as applied to the LEDs or LED groups may e.g. be substantially constant.

Alternatively, one may continue to operating in a VLC transmission mode during the predetermined period used for compensating the color, whereby the transmission involves transmitting one or more code words that have no informational meaning.

In the given example, the color compensation may e.g. involve to generate, during a predetermined period, an illumination primarily using LED 100.3 after the transmission of one or N code words primarily using LEDs 100.1 and 100.2, in order to arrive at an average color 105.

As will be understood, the number of code words that can be transmitted before a compensation is required may depend on the difference between the applied color during the VLC transmission (e.g. colors 100.1 and 100.2) and the desired color 105. Based on this difference (which can e.g. be referred to as color-error), one may decide to compensate color after every code word or after every N code words.

An alternative or additional method to enable the generation, on average, of a desired color set point when applying a VLC method according to the present invention is illustrated with reference to FIG. 4c.

Figure 4C:
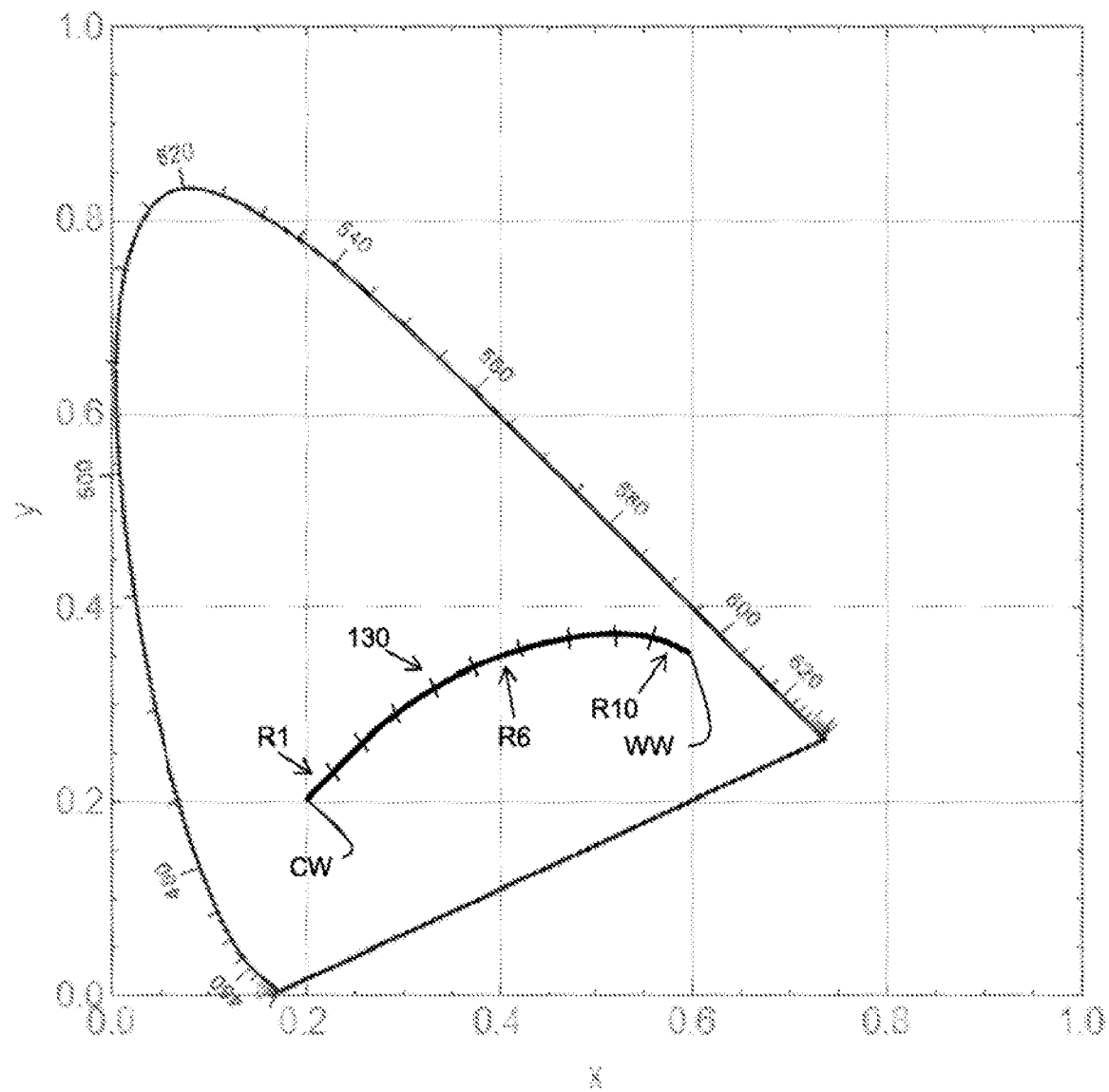

FIG. 4c schematically shows a CEI chromaticity diagram including a contour 130 known as the black body line indicating white colors ranging from cold white (CW) to warm white (WW), which may e.g. be generated by a particular combination of LEDs.

In an example, it is assumed that a desired color set point will substantially correspond to a color at or near the contour 130.

In order to increase the number of different symbols that may be transmitted, a similar approach as discussed with reference to FIG. 4b can be applied, whereby, in this case, the contour 130 is subdivided into segments, each segment indicating a color range that can be used to distinguish between symbols. As an example, when the contour 130 covers a white color ranging from 2400 Kelvin (K) to 3400 K and is subdivided in 10 segments (indicated by references R1-R10), each spanning a range of 100 K & 4 different durations or periods (T0-T3) are used to characterized symbols, 4×10=40 distinct symbols could be generated. In case a code word would consist of 4 symbols, one could thus generate $40^4$ different code words.

In order to facilitate the compensation of a color-error, i.e. occurring when the symbols or code words that are to be transmitted have a different color than the desired color, one can attribute two or more distinct colors or color ranges to the same symbol. For the given example where the contour 130 is subdivided into 10 segments or color ranges, one could e.g. define the color range CR for a particular symbol S as a combination of two segments.

A symbol S0 could then be characterized by its duration T0 and a color in the range R1 or R10.

A symbol S1 could then be characterized by its duration T1 and a color in the range R2 or R9.

A symbol S2 could then be characterized by its duration T2 and a color in the range R3 or R8.

A symbol S3 could then be characterized by its duration T3 and a color in the range R4 or R7.

A symbol S4 could then be characterized by a duration T4 and a color in the range R5 or R6.

By doing so, one can transmit a symbol S0 by either applying a color in the range R1 or in the range R10.

As will be appreciated by the skilled person, this increased flexibility in selecting a color to transmit a particular symbol, may facilitate in maintaining an average applied color close to a desired color.

Applying the above method may limit the number of symbols that can be generated, compared to the situation where each range R1-R10 is used to indicate a different symbol. However, it may reduce the idle time, i.e. the time during which no VLC transmission can be performed because a color compensation needs to be applied.

In the above example, the symbol S0 is characterized by having a color in either range R1 or range R10, i.e. the two most extreme segments of the contour 130. By selecting segments to characterize the color of a symbol that are remote enables to select the most appropriate color to transmit a symbol, given a desired color set point. In the given example, the color difference between segments associated with the same symbol (e.g. difference between R1 and R10 or the difference between R2 and R9) varies per symbol. An alternative definition of the color range for the different symbols could arrange for a substantially constant difference:

A symbol S0 could be characterized by its duration T0 and a color in the range R1 or R6.

A symbol S1 could be characterized by its duration T1 and a color in the range R2 or R7.

A symbol S2 could be characterized by its duration T2 and a color in the range R3 or R8.

A symbol S3 could be characterized by its duration T3 and a color in the range R4 or R9.

A symbol S4 could be characterized by a duration T4 and a color in the range R5 or R10.

It is further worth mentioning that the same principle can be applied when symbols are characterized by a particular area in the CEI diagram, e.g. areas 120.1 or 120.2 in FIG. 4b. in particular, with reference to FIG. 4b, one can characterize a particular symbol by its duration and by having a color inside either one defined area or inside a combination of different defined areas.

As an example, a symbol S0 could be characterized by its duration T0 and a color in the area 120.1 or 120.3, while a symbol S1 could be characterized by its duration T1 and a color in the area 120.2 or 120.4. As will be understood by the skilled person, the transmission of symbols S0 and S1 using this definition would facilitate maintaining a desired color set point such as color set point 105 during the transmission. As a consequence, the need to apply a color compensation scheme may become smaller.

In such embodiment, i.e. whereby a particular symbol can be transmitted by either one of a plurality of color, the following operating scheme can be applied:

When the current modulation schemes of the different LEDs or LED groups are determined that need be applied to generated the desired VLC code, the average color that will be generated when the current modulation schemes are applied, can be monitored or determined.

Assuming that the required current schemes for the transmission of M symbols have been determined and that such transmission would result in the generation of particular color CX, CX e.g. corresponding to the average color generated during the transmission of the last N symbols of the M symbols, N e.g. being equal to M or smaller than M. Assuming that this color CX deviates from a desired color Cd, Cd e.g. being represented by a color set point. At this point, one may determine the current scheme for transmitting symbol M+1 by:

selecting the most appropriate color for the transmission of symbol M+1 and, determining the required modulation scheme.

In an embodiment of the present invention, the step of selecting the most appropriate color for the transmission of the symbol M+1 may be based on the average color CX and the desired color Cd. In particular, the color for transmitting symbol M+1 may be selected so as to diminish the difference between CX and Cd, or, phrased differently, select the color for transmitting the symbol M+1 ins such manner that a new value for CX, CX now being the average color of the last N symbols of the M+1 symbols becomes closer to Cd.

Note that the average color as defined may be considered a moving average color, corresponding the average color generated during the transmission of the last N symbols. Note that in a similar manner, a moving average color may also be determined as the average color generated during a previous transmission period having a fixed predetermined duration or period. In an embodiment, such a predetermined duration or period may be associated with a frequency at which an observer can notice color variations.

By applying such an operating scheme, one may e.g. be able to generate an average color or moving average color corresponding or substantially corresponding to the desired color.

It can be noted that the described operating scheme can be performed per symbol or per code word.

It is submitted that such operating scheme to determine the most appropriate color for transmitting a particular symbol or code word may e.g. be performed in advance, i.e. prior to transmitting a particular VLC code. In such embodiment, the communication method according to the present invention may thus comprises determining current modulation schemes for each LED or LED groups of a plurality of LEDs or LED groups in such manner that, during the transmission of the VLC code, i.e. during the application of the current modulation schemes, the average color or moving average color as generated substantially corresponds to a desired color, e.g. represented by a color set point.

Alternatively, the operating scheme can be executed in real time. In such a real time implementation one can e.g. in real time, keep record of the average color or moving average color as generated so far and, upon receipt of a new symbol or code word to be transmitted, select the most appropriate color and determine the associated current modulation scheme for transmitting the symbol or code word.

It can further be noted that, in case a sufficient correspondence between the moving average color CX as generated and the desired color Cd would not be feasible, a color compensation scheme as discussed may be implemented.

As discussed above, in an embodiment of the present invention, a symbol or code word that is to be transmitted using a visual communication method according to the present invention, may be characterized by both a duration or period and a color or color characteristic. In an embodiment, as discussed above, the color characterizing a symbol may refer to the average color used during the transmission of the symbol or the code word.

In an alternative embodiment, a symbol may be characterized by the type or kind of LED used to generate the modulated current profile. In such embodiments, the color or color characteristic of the LED or LED group that is used to obtain a modulation on the combined current profile may determine which symbol is transmitted. This method can be best understood with reference to FIG. 3.

In FIG. 3, modulation schemes for a current I1 and a current I2 are shown, whereby symbols can be determined based on the duration. In the scheme as shown, current I1 is kept constant, while current I2 is modulated such that the combined current profile comprises a modulation which can be observed by a receiver and used to determine which symbols are transmitted. It can further be noted that the average current I2 over a symbol, e.g. S0, is the same as the average current I1 over that symbol. As such, with respect to the generated illumination, the same illumination is assumed to be generated when current I1 would be modulated and current I2 would be kept constant. In accordance with an embodiment of the present invention, these two modulations (either modulating current I1 and keeping current I2 constant or modulating current I2 and keeping current I1 constant) may however be considered to define different symbols. In a similar manner, one could even opt to modulate both I1 and I2 and this would then represent a third symbol. As such, in case current I1 and I2 are supplied to LEDs or LED groups having a different color or color characteristic, different symbols may be defined, each having the same duration, depending on the LED or LED groups that is supplied with a modulated current.

Note that in general, unlike the example shown in FIG. 3, the average of current I1 will not be the same as the average of current I2, or, the desired color would not correspond to the color as generated by an equal average current I1 and I2. In such situations, color compensating schemes as discussed above may need to be implemented in order to arrive, on average, at a desired color, e.g. represented by a received color set point.

During the transmission via VLC, there are a large number of requirements that need to be met in high end illumination systems. As mentioned above, in order to realize the VLC, a sufficient modulation depth is required. Further, in order avoid flicker, which could cause nausea for certain observers, the frequency content of the intensity modulations should be sufficiently high. In addition, during the VLC, a desired illumination and color set-point should be preserved.

It would also be preferred that the mentioned requirements are maintained also during transients. Within the meaning of the present invention, transients may e.g. include a transition between a first illumination set-point and a second illumination set-point, an illumination set-point e.g. being characterized by a desired illumination intensity and an illumination color. During such a transition, it would be desirable to maintain the requirements, e.g. w.r.t. modulation depth, for using VLC, such that a transition between a first illumination set-point and a second illumination set-point can be performed without interruption of the VLC, i.e. the visible light communication. In addition, such a transient should be flicker-free, i.e. the transient should not be visible. A transition for a non-VLC mode to a VLC mode or vice versa may also be considered a transient.

In an embodiment of the present invention, a transition from a first illumination set-point to a second illumination set-point, during VLC is performed by gradually adjusting the current profile, in particular by only adjusting, when a next code word is transmitted, the current profile of only some of the symbols that make up the code word, i.e. not all the symbols, in a first step, upon receipt of a set-point representing a different illumination characteristic as represented by the current profile, only the current profile of some of the symbols. In a second step, the current profile of other symbols may be adjusted, to arrive more closely to the desired second illumination set-point.

By doing so, a gradual transition from a first illumination set-point to a second set-point is realized, thereby maintaining an accurate VLC operation.

In an embodiment of the present invention, such a gradual adjustment is realized by means of transitioning via one or more intermediate current profiles.

Such embodiment may e.g. be realized by means of a control unit which may be applied to control an LED driver configured to drive a plurality of LEDs, whereby the control unit is configured to:
  generate a current profile for each of the plurality of LEDs
    to generate the desired illumination characteristic represented by a received set-point, whereby an envelope of the combined current profile is modulated in order for a corresponding intensity variation as perceived by a sensor to represent a variable length VLC code comprising code words, a code word comprising a plurality of symbols, and wherein the control unit is further configure to:
  receive a further set-point representing a different desired illumination characteristic as represented by the set-point, determine a further current profile for one or more of the plurality of LEDs to generate the different desired illumination characteristic represented by the further set-point, and
  determine one or more intermediate current profiles for one or more of the plurality of LEDs, and
  output control signals for the LED driver to sequentially drive the plurality of LEDs according to:
    the current profiles when transmitting a first code word;
    the one or more intermediate current profiles, when transmitting a respective one or more further code words, and
    the further current profiles when transmitting a yet further code word.

By controlling the plurality of LEDs in such manner, a gradual transition form a current profile to a further current profile is realized via one or more intermediate current profiles, whereby the current profile is adjusted per code word that is to be transmitted. By applying such a gradual transition between a first illumination set-point and a second illumination set-point, the transmission of VLC can more easily or more accurately sustained.

In an embodiment, care is taken that the modulation depth is not decreased during the transition from a first intensity/color set-point to a second intensity/color set-point.

In an embodiment, the current profile is adjusted proportional for each of the LEDs of the plurality of LEDs. By doing so, the color set-point may be maintained during the transient.

In the current profiles in FIGS. 3 and 4, one can recognize that the current may be adjusted at only predetermined instants spaced apart by incremental period W, with predetermined amounts, spaced apart by the incremental current step ICS. The smallest current increment that can be applied to a current profile is thus to increase or decrease the current with the incremental current step ICS during a period equal to the incremental period W. This smallest increment is referred to as the minimal period current increment.

Figure 5:
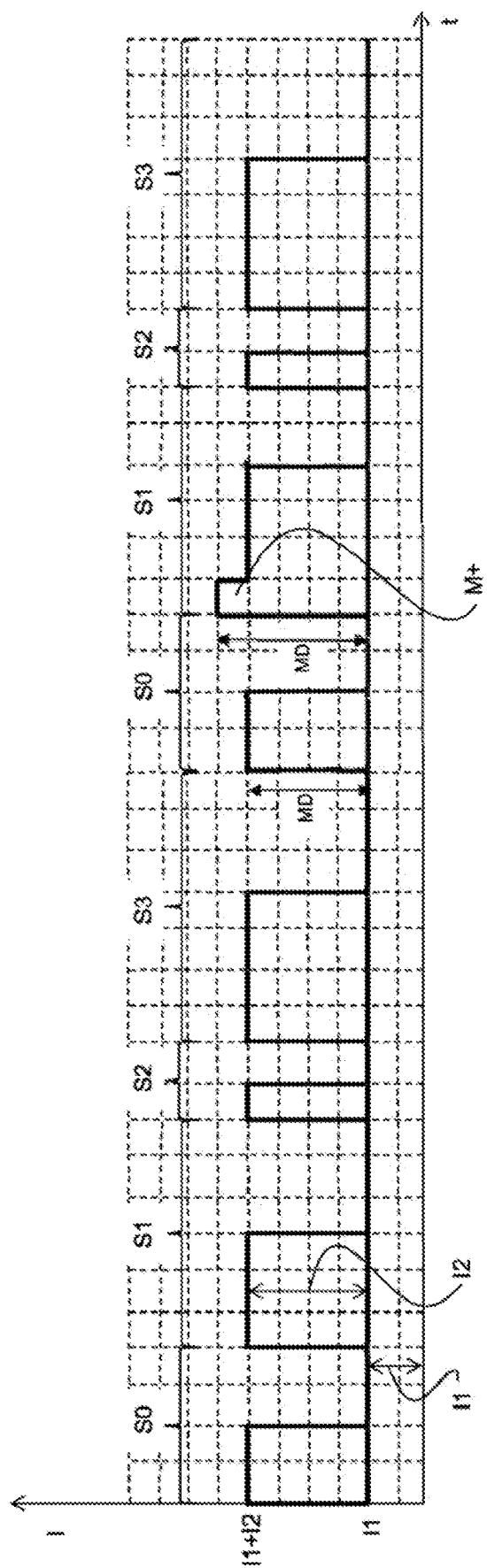
FIGS. 5 and 6 depict current profiles for a sequence of two code words to be transmitted using VLC, the second code word having an amended profile.

FIG. 5 schematically shows the current profiles for a first code word (consisting of symbols S0,S1,S2,S3), followed by a current profile for transmitting the same code word, whereby a positive minimal period current increment M+ is applied to the second profile, in particular at the start of the symbol S2.

Figure 6:
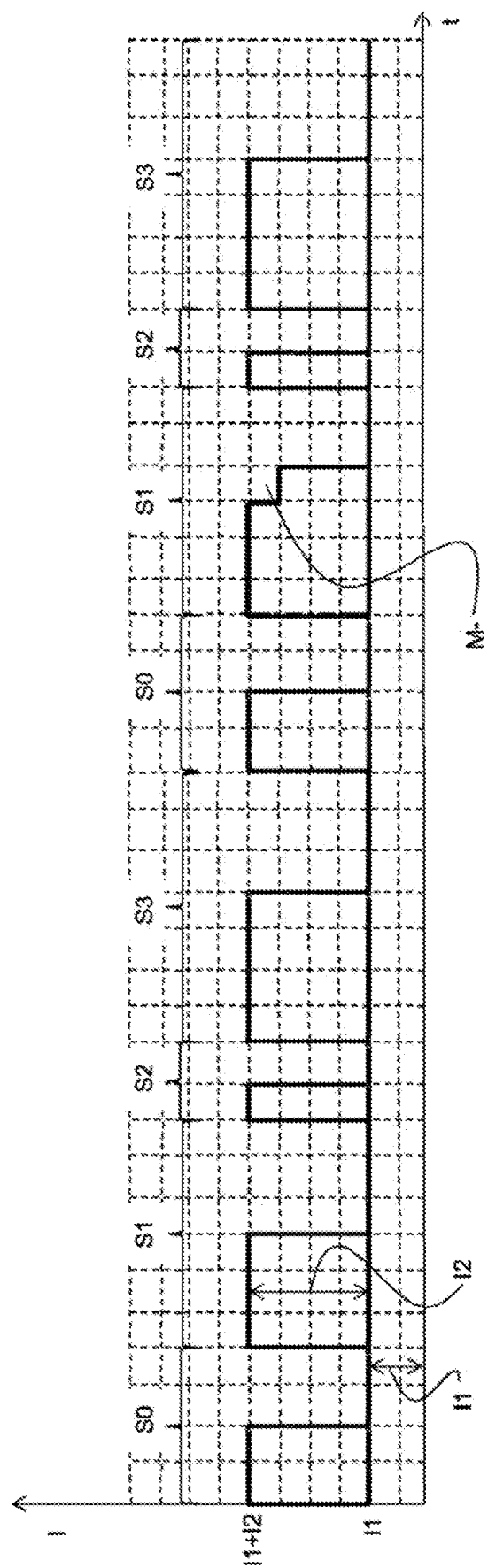

In order to gradually decrease the intensity, in an embodiment of the present invention, the current profile of a next to be transmitted code word is adjusted by applying a negative minimal period current increment. Such an embodiment is shown in FIG. 6. FIG. 6 schematically shows the current profiles for a first code word (consisting of symbols S0,S1, S2,S3), followed by a current profile for transmitting the same code word, whereby a negative minimal period current increment M− is applied to the second profile, in particular at the end of the high current portion of symbol S2.

In an embodiment of the present invention, the current profile of the plurality of LEDs is adjusted by only one minimal period current increment per code word that is transmitted.

In an embodiment of the present invention, a symbol is characterized by its length or duration in time, or period. In the VLC code as applied in the present invention, a symbol may thus be characterized or identified by having a predetermined period or length in time. When a sequence of symbols is to be transmitted, the end of a symbol, corresponding to the start of a next symbol, is triggered by a step (either positive or negative) function. Such a step function may be realized in various manners. In the embodiments as shown in FIGS. 2, 3, and 4, the step function is realized by applying a substantial increase in the total current profile at the start of a next symbol, thus indicating the end of a symbol. In order to realize this, the symbols as shown in FIGS. 2, 3, and 4 each start with a comparatively high total current portion HCP, total current referring to the summed current of all the LED currents, and end with a comparatively low total current portion LCP. Phrased differently, each of the plurality of symbols that is to be transmitted can be characterized by a respective predetermined period, e.g. period S0,S1,S2,S3. In order for a sensor to identify these symbols, the combined current profile of the plurality of LEDs of LED groups applied is modulated in such manner that during each of the predetermined periods, the combined current profile has a high current period, e.g. the high total current portion HCP, and a low current period, e.g. the low total current portion LCP.

In an embodiment, the total current or combined current of the current profiles, or the envelope of the combined current is such that the total or combined current during the high current periods is substantially the same for all symbols, or all words that are to be transmitted and is such that the total or combined current during the low current periods is substantially the same for all symbols, or all words that are to be transmitted.

Alternatively, the high current portions of the total or combined current may be different for different symbols in a code word. Similarly, the low current portions of the total or combined current may be different for different symbols in a code word.

In the embodiments as shown in FIGS. 2, 3, and 4, a transition from a high current period to a low current period within the predetermined period representing a symbol or from a low current period to a high current period within the predetermined period representing a symbol can be considered a step function. Alternatively, a more gradually transition may be applied as well. During such a more gradual transition, the transition from a high current level to a low current level can e.g. take place over multiple incremental periods or clock periods, such as the period W shown in FIG. 2.

In the embodiments shown in FIGS. 2, 3, and 4, the end of a symbol can be detected as the occurrence of a positive step, i.e. an increase of the total current. In particular, referring to FIG. 3, the total current as applied to the plurality of LEDs increases from a comparatively low value (value I1) to a comparatively high value (value I1+I2) at the end of the symbols S0, S1, S2, S3. The low total current value and the high total current value should be selected in such manner that the associated intensity variation is sufficiently large that it can be detected by a sensor that is to receive the VLC.

Figure 7:
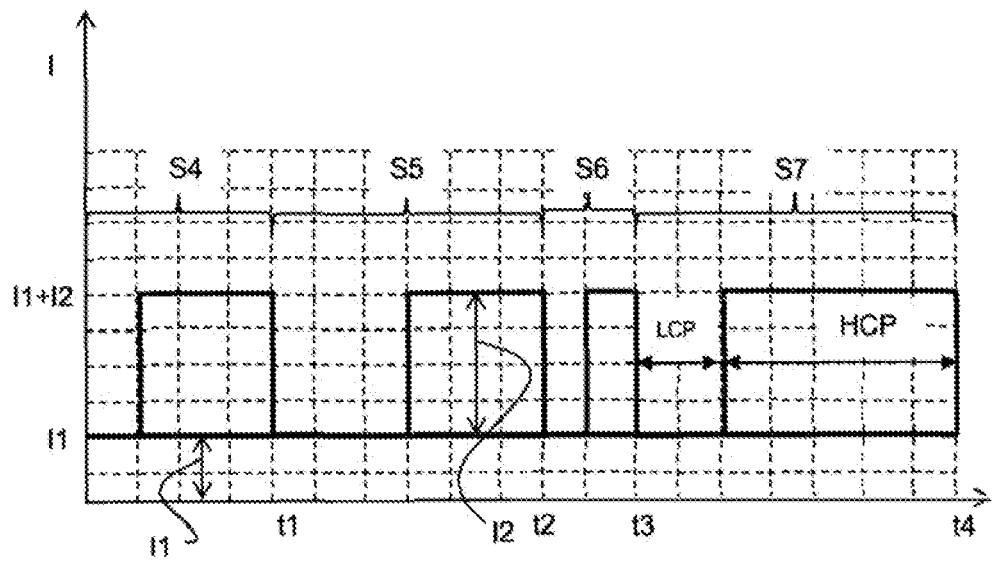
FIGS. 7 and 8 depict alternative current profiles representing symbols to be used in a variable length VLC method.

Alternatively, one could trigger the end of a symbol by a negative step function, i.e. by applying a substantial decrease in the current symbol at the end of a symbol. FIG. 7 schematically illustrates different symbols S4,S5,S6,S7 that are represented in this manner.

In the embodiment as shown, the end of the symbols S4,S5,S6,S7 corresponds to the instants where the current I2 is reduced to zero, i.e. at instants t1, t2, t3 and t4.

At these instants, there will be an important decrease in the intensity of the illumination as provided by the LEDs, such decrease may be detected by a sensor, thus enabling the determination of the duration or periods of the different symbols.

With respect to adjusting of an intensity and/or color set-point during operation in a VLC mode, i.e. during visible light communication, it can be pointed out that such an adjustment may also be realized by adjusting the relative duration of the high current portion HCP and the low current portion LCP.

Figure 8:
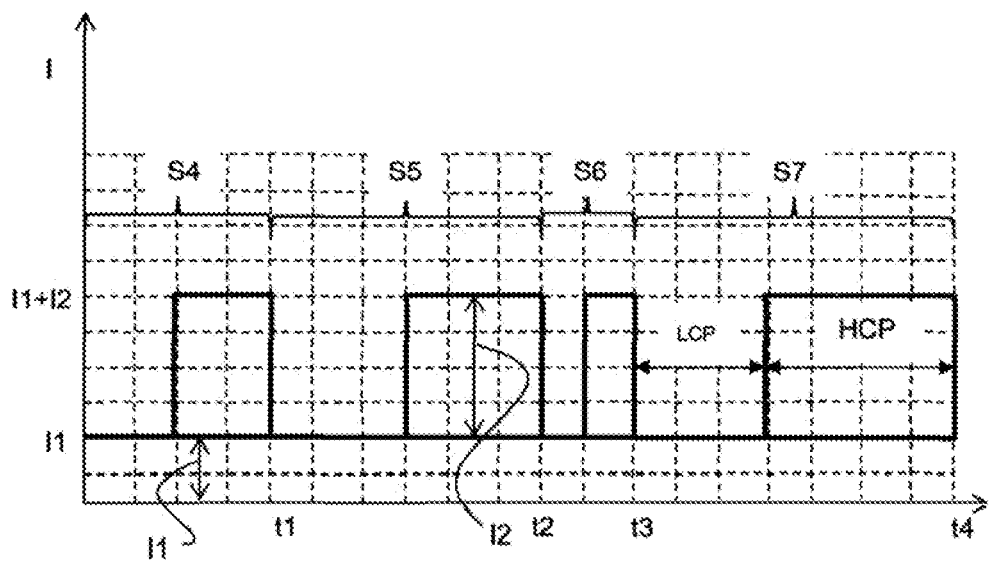

This is schematically illustrated in FIG. 8. FIG. 8 schematically illustrates the same symbols S4,S5,S6,S7 of FIG. 7, whereby, compared to FIG. 7, the HCP of both symbols S4 and S7 is decreased.

Increasing or decreasing the relative width or duration of the high current portion or period and the low current portion or period thus provides in an additional way, compared to increasing or decreasing the current amplitude, of adjusting an intensity of a light source, during the operation in VLC mode.

With respect to increasing or decreasing an amplitude of the current, e.g. either current I1 or I2 during a part of the HCP, as illustrated in FIGS. 5 and 6, it can be pointed out that it may be advantageous, for the symbols that start with a HCP, to implement a positive current increment, such as the positive minimal period current increment M+ shown in FIG. 5, at the beginning of the HCP of a symbol and to implement a negative current increment, such as the negative minimal period current increment M− shown in FIG. 6, at the end of the HCP of a symbol.

In case of the application of the positive minimal period current increment M+ shown in FIG. 5 at the beginning of the symbol S1, this increment result in an increase in the modulation depth MD for this symbol. As can be seen, the modulation depth MD for symbol S1 is larger than then the modulation depth MD for symbol S0. Applying a negative minimal period current increment M−, as shown in FIG. 6, at the end of the HCP of a symbol enables to avoid that the modulation depth would become smaller.

As indicated above, in order to adjust an intensity of the light emitted by the LEDs or LED groups, the current profiles can be adjusted, either by adjusting an amplitude of the current, e.g. an amplitude of a current profile, or by adjusting a width of a portion of the current profile. In an embodiment, the current profiles are adjusted such that the frequency content of the profile is not lowered, i.e. care is taken that no lower frequencies are introduced by determining the adjusted or intermediate current profiles. When considering this, it may e.g. be preferred to introduce one or more current increments to a current profile, rather than widening or narrowing an HCP of a current profile.

The application of current increments or the application of gradual transitions between current levels or combined or total current levels enables to adjust or control the frequency content of the current profile or total current profile as applied. Controlling the frequency content of the applied current profile enables to control the occurrence of flicker as observed by a human observer. According to a second aspect of the present invention, there is thus provided a method of transmitting data using a variable length VLC code, wherein these current increments or gradual transitions are implemented.

In an embodiment, the present invention provides in an improved method of transmitting data using a variable length VLC code in that in enables to mitigate the occurrence of flicker, in particular during a VLC transmission, by the application of current increments to the current profiles representing the symbols that are transmitted, or the application of gradual transitions between current levels or combined or total current levels.

As illustrated in FIG. 2, data or information may be coded into an array of symbols, whereby a particular combination of symbols may be construed as words. In the variable length VLC code according to the present invention, symbols are identifiable, as illustrated in FIG. 2, by their length, whereby the beginning and ending of symbols may be noticed by a (steep) increase or decrease of the generated intensity of the plurality of LEDs applied, the combined current profile being representative of the generated intensity.

In the method according to the present invention, particular measures may be taken to ensure that the transmission of the VLC code is satisfactory, under various circumstances, e.g. various illumination set-points, whereby illumination may refer to either color or intensity or both. As indicated above, in order to identify the VLC code that is transmitted, intensity variations of the light as perceived by a sensor, e.g. a sensor in a user equipment such as a smartphone, are relied upon. Such variations, which can e.g. be quantified by the aforementioned modulation depth, should be sufficiently high in order for a processing unit, e.g. a processing unit of a user equipment that needs to receive the VLC signal, to determine the beginning and end of the various symbols that are transmitted. Typically, such a user equipment, e.g. a smartphone or the like, would comprise a sensor that is configured to detect the illumination that is transmitted by the plurality of LEDs and a processing unit configured to process an illumination signal received form the sensor, the illumination signal representing the detected illumination. Based on the illumination signal, the processing unit may determine the beginning and end of the various symbols that are transmitted. This can e.g. be done using threshold detection but can also be done using fast fourier transform. Such processing of a received sensor signal can e.g. comprise the filtering out of a DC level of the illumination signal and perform a processing of the remaining filtered (AC) signal.

In an embodiment, the envelope of the current profile of the different LED groups is such that it comprises a modulation that can be detected by a user equipment comprising a sensor and a processing unit and is sufficiently large so as to determine which symbol it represents. In an embodiment, rather than each symbol having an HCP and an LCP, each with a substantially constant current, a current increment is applied, either at the HCP or at the LCP or both. Such a current increment can be applied on each symbol of a word or on only a subset of symbols of a word, e.g. on only one symbol.

In an embodiment, the current increment is applied to the longest symbol.

Figure 9:
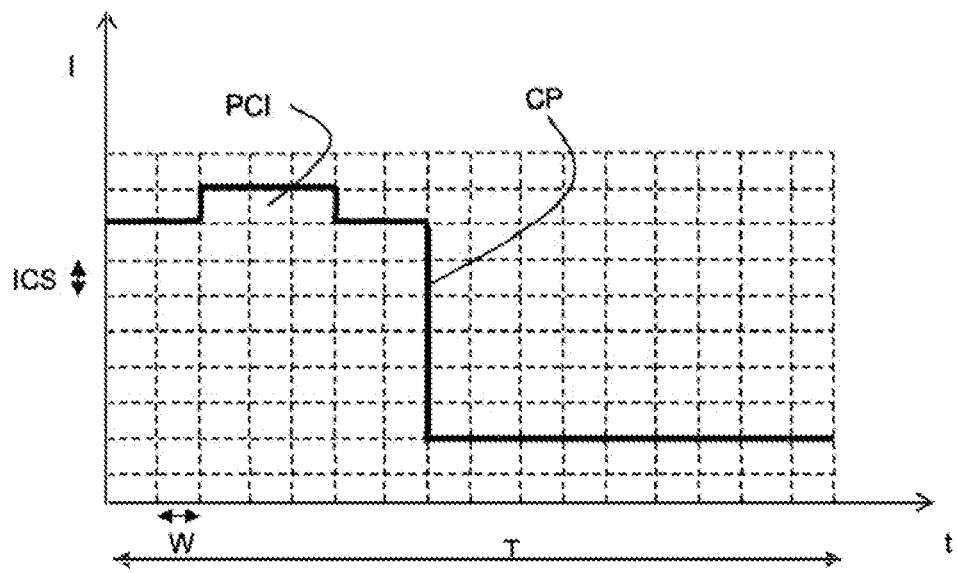
FIGS. 9a-9c and 10 depict current profiles as can be applied by an LED driver according to the present invention during operation in VLC mode.
Figure 9:
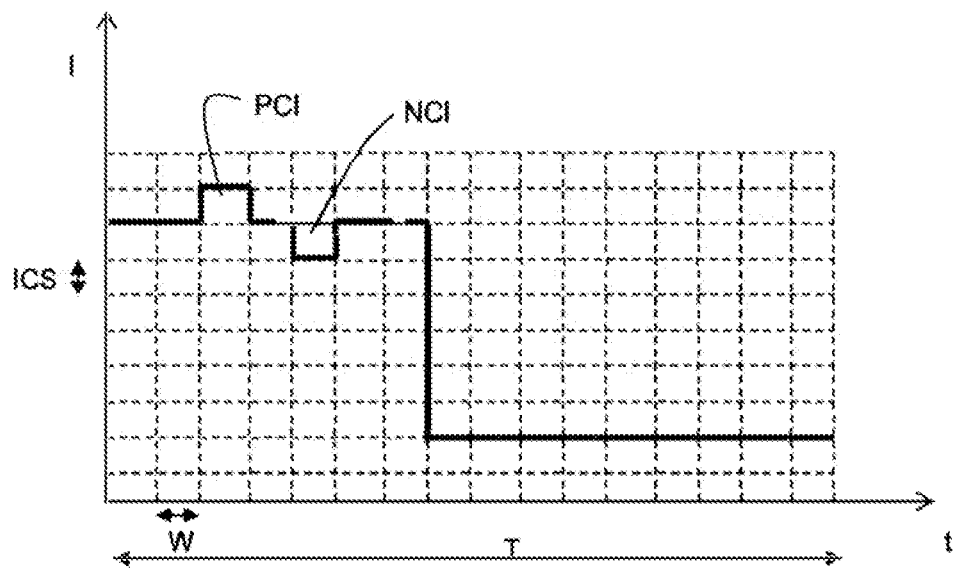
Figure 9:
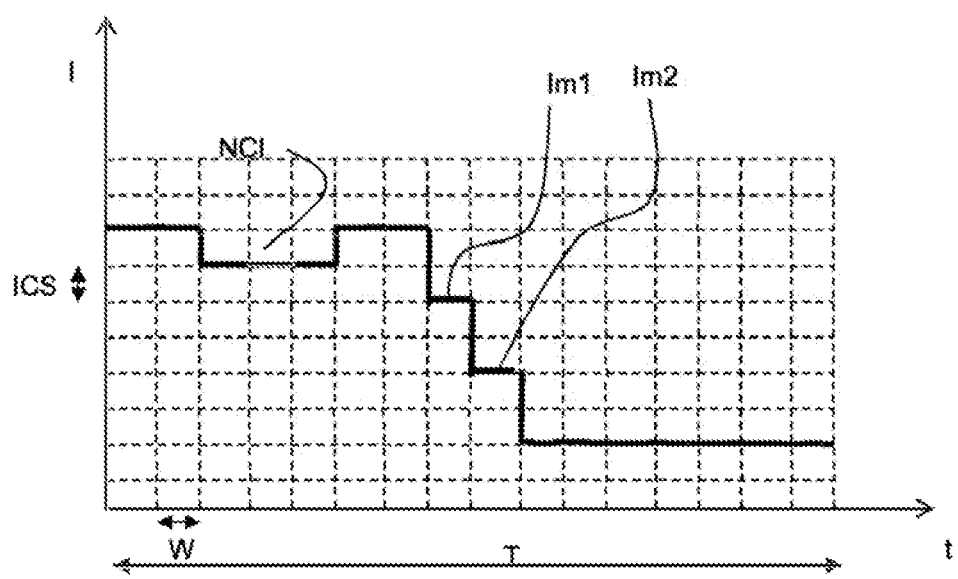

FIG. 9 schematically depicts various possible modulations as can be applied in a method according to the present invention. The possible modulations as shown can be considered modifications to the modulation as shown in FIG. 2.

In the current profile shown in FIG. 9(a), a positive current increment PCI is applied in the high current portion HCP of the current profile CP.

In the current profile shown in FIG. 9(b), a positive PCI and a negative current increment NCI are applied.

In the current profile shown in FIG. 9(c), a negative current increment NCI is applied and a gradual transition between the HCP and the LCP via two intermediate current levels Im1 and Im2.

In an embodiment, the current modulation is realized with only one LED group of the plurality of LED groups. Phrased differently, in such embodiment, the modulation depth may entirely be attributed to a transition of a current supplied to one of the LEDs or LED groups from a comparatively low current (e.g. zero) to a comparatively high current, while the currents supplied to the other LED or LED groups are kept substantially constant.

Such a situation is e.g. depicted in FIG. 3, whereby the modulation depth is entirely determined by the modulation of the current I2.

In an embodiment of the present invention, it is assumed that the currents as supplied to the plurality of LEDs or LED groups may be independently controlled. Such an arrangement may e.g. allow to supply a first LED group with a modulated current, e.g. switching between a high level and a low level, and to supply a second LED group with a substantially constant current.

Such an embodiment may e.g. be implemented in case the desired intensity is comparatively high. In such case, the required modulation depth for a successful VLC operation may be realized with only one LED or LED group of the plurality of LEDs or LED groups.

As such, in an embodiment of the present invention, the modulation applied to the current envelope representing the combined current profiles of the LEDs or LED groups is realized with only one LED or LED group of the plurality of LEDs or LED groups, in case the desired intensity is above a predefined threshold.

In such a situation, additional criteria such as efficiency or an accurate representation of a desired color or avoiding the occurrence of flicker may be considered as well, in addition to the requirement of enabling the operation in VLC mode.

As such, in an embodiment, of the present invention, current increments as e.g. shown in FIGS. 9a-c are applied to the current profiles to obtain a desired color set-point, in case the desired intensity, e.g. derived from a received illumination set-point, is above a predefined value or threshold.

In an embodiment of the present invention, a desired color set-point or intensity set-point need not be realized for each symbol of a code word separately; rather, it may be sufficient that the current profiles as applied for transmitting a code word, i.e. a combination of a plurality of symbols, are such that a desired color set-point or intensity set-point is realized. By doing so, a desired color set-point or intensity set-point can be more accurately obtained. I.e. a higher resolution w.r.t. color and/or intensity can be realized. In such embodiment, the use of one or more current increments to one or more symbols of a code word that is to be transmitted further increases the possibilities to generate a desired color set-point or intensity set-point.

In an embodiment, different current increments are applied to different symbols of a word. As an example, a positive current increment may be applied on the first symbol, whereas a negative current increment can be applied on a second symbol of a word.

The current increment may be applied on only one current or current profile or on multiple currents or current profiles.

In order to ensure a proper detection or demodulation of the VLC signal, the modulation depth should be sufficiently large. In general, a sufficiently large modulation depth may be realized comparatively easy when the intensity set-point is rather high.

At comparatively low intensity set-points, the modulation depth may e.g. be realized by providing multiple currents or current profiles with an HCP followed by an LCP. In an embodiment, the transitions from an HCP to an LCP for the multiple currents may be synchronized.

Figure 10:
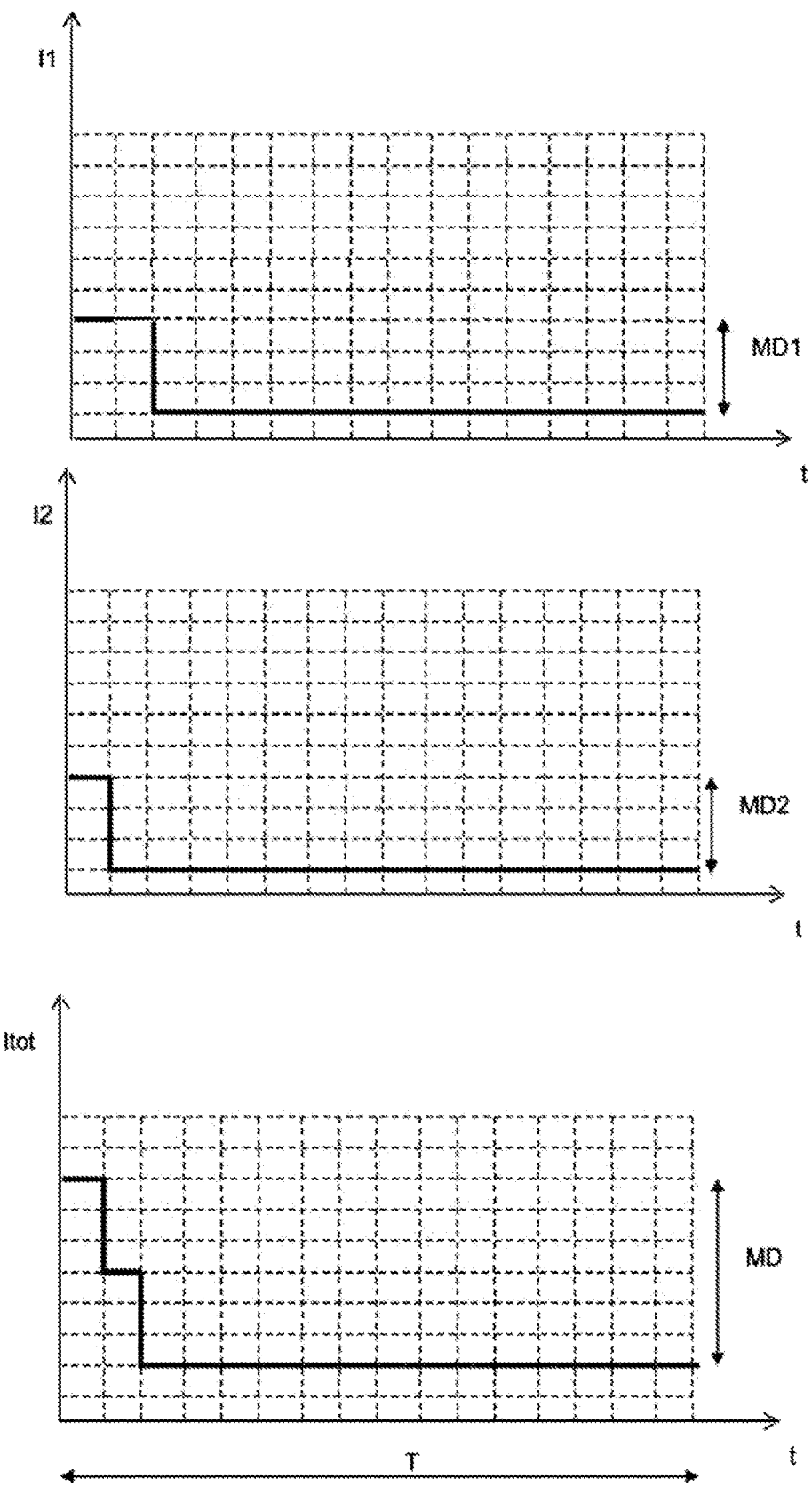

FIG. 10 schematically shows a current profile of a first current I1, e.g. supplied to a first LED or LED group and a current profile of a second current I2, e.g. supplied to a second LED or LED group and the envelope of the resulting current Itot. In an embodiment, the first LED or LED group may have different characteristics that the second LED or LED groups, e.g. a different color spectrum. Each of the currents I1 and I2 has a profile with a high current portion HCP followed by a low current portion LCP, in a period T, e.g. representing a particular symbol in a variable length VLC code. As a result, each current may be considered to have a modulation depth, MD1, resp. MD2. The resulting current Itot will have the combined modulation depth MD, which may e.g. be sufficiently large for a user equipment, in particular a sensor of a user equipment, to detect the intensity variation associated with the current variation, so as to determine the length, duration or period T.

In this respect, it can be noted that, in general, the conversion from current to light and the sensitivity of the human eye (or of an illumination sensor) will not be equal for all types of LED and all colors (spectra). These differences may e.g. be taken into account when determining the current profiles applied for the different LED groups. In order to implement this, an LED driver according to the present invention may be provided with a sensitivity characteristic or function of one or more illumination sensors, the characteristic indicating the sensor's sensitivity as a function of frequency. Using such information, it may e.g. be advantageously to implement the largest modulation step in a current for an LED or LED group having a color spectrum for which the sensor is the most sensitive.

By applying current transitions (e.g. MD1, MD2) in multiple current profiles, whereby the summed transition serves as an overall modulation depth (MD), operating in VLC mode may even be possible at comparatively low intensities. Note that, in order to ensure proper operation in VLC mode, i.e. ensuring a sufficiently large modulation depth MD, one may need to make concessions with respect to other criteria that may need to be met, e.g. a desired color set-point.

Generalizing this, the skilled person may understand that, apart from the realization of a particular illumination set-point, e.g. specified by a desired intensity and color, other criteria or requirements may be desired as well. Such criteria may e.g. include the avoidance of flicker, driver efficiency, etc. In case a VLC code is to be transmitted by modulating the intensity of the generated light, the realization of the various requirements may come into conflict with each other. Phrased differently, not all required or desired characteristics may be realized; a selection or prioritizing of the goals to be achieved may be required.

As an example, it may be difficult to realize a desired modulation depth when the desired intensity of the generated light drops below a certain value. In such an embodiment, a desired color set-point is only approximated when the desired intensity is below a certain, predetermined or predefined threshold and operating in VLC mode is required.

On the other hand, in case the desired intensity is comparatively high, it may be comparatively easy to realize a desired modulation depth, i.e. the desired or required illumination depth may be realized in different manners. In such circumstances one may e.g. use this operational freedom to further optimize the operation of e.g. the LED driver supplying the power to the LEDs or LED groups. In an embodiment, such an optimization may include optimizing the operation of the LED driver towards efficiency. Alternatively, the operation of the LED driver may be optimized towards the most accurate realization of a desired color set-point.

In accordance with an aspect of the present invention, the modulation scheme of the current or currents supplied to a plurality of LEDs or LED groups is such that priority is given in attaining the visible light communication, while mitigating the occurrence of flicker. In such embodiment, the desired illumination set-point, e.g. characterized by an intensity and a color, may not be accurately generated, but only approximated. In such situation, priority may e.g. be given to generating light with the desired intensity combined with a current modulation with a sufficient modulation depth. In order to generate this sufficient modulation depth, concessions with respect to color may have to be made.

In an embodiment, the present invention provides in an LED driver that is configured to perform the above described methods of operating a plurality of LEDs or LED groups, in order to transmit a VLC code.

In such embodiment, the LED driver may comprise a control unit to receive an illumination set-point and data to be transmitted. Such a control unit may further be configured to determine the required current profiles and generate control signals for a power converter of the LED driver, in order to generate the required current profiles.

In an embodiment, such an LED driver may be configured to operate in three different operating modes, depending on an intensity set-point.

In a first operating mode, characterized by the intensity set-point being below a first predetermined value or threshold, priority is given to obtaining a required modulation depth for transmitting a VLC code, irrespective of a desired color set-point or other criteria.

In a second operating mode, characterized by the intensity set-point being above a second predetermined value or threshold, the LED driver may be configured to consider a further criterion to be met, apart from the illumination set-point. Such a criterion may e.g. be an optimization of the efficiency of the LED driver, or an optimization w.r.t. flicker; i.e. optimizing the current profiles of the LEDs or LED groups such that flicker is minimized.

When operating in the second operating mode, the LED driver, in particular the control unit of the LED driver, may e.g. be configured to apply a plurality of current increments to the plurality of symbols that form a code word, thereby increasing a frequency content of the current profile or current profiles. Such measures have been found to mitigate or avoid the occurrence of flicker. The application of one or more current increments may further enable to accurately obtain the desired color set-point. At the same time, the current profiles may be selected so as to optimize efficiency of the LED driver. An optimization of the efficiency may e.g. be realized by considering one or more of the following:
  an overall efficiency characteristic of the LED driver driving the plurality of LEDs or LED groups;
  switching losses in the switches controlling the current through the LEDs or LED groups;
  illumination characteristics of the LEDs or LED groups (i.e. current vs. illumination for the LEDs or LED groups.

In a third operating mode, characterized by the intensity being in between the first threshold and the second threshold, the LED driver may e.g. be configured to focus of obtained the desired illumination set-point and to avoid or mitigate flicker during VLC transmission, rather than optimizing the efficiency.

The LED driver according to the present invention may be configured to be combined with an LED fixture comprising LEDs or LED groups for realizing desired illumination set-points.

Examples of such LED fixtures may e.g. comprise LEDs or LED groups emitting different colors or different color spectra. Such fixtures may e.g. include RGBW (red, green, blue, white) or RGBA (red, green blue, amber), RGBWA (red, green, blue, white, amber), RGB UV (red, green, blue, ultra-violet) LED groups, or combinations thereof.

LED fixtures may also comprise different types of white LEDs, e.g. a combination of WW (warm white) LEDs and CW (cold white) LEDs.

In an embodiment, an LED driver according to the present invention comprises one or more power converters, e.g. switched mode power converters such as Buck or Boost converters.

Figure 11:
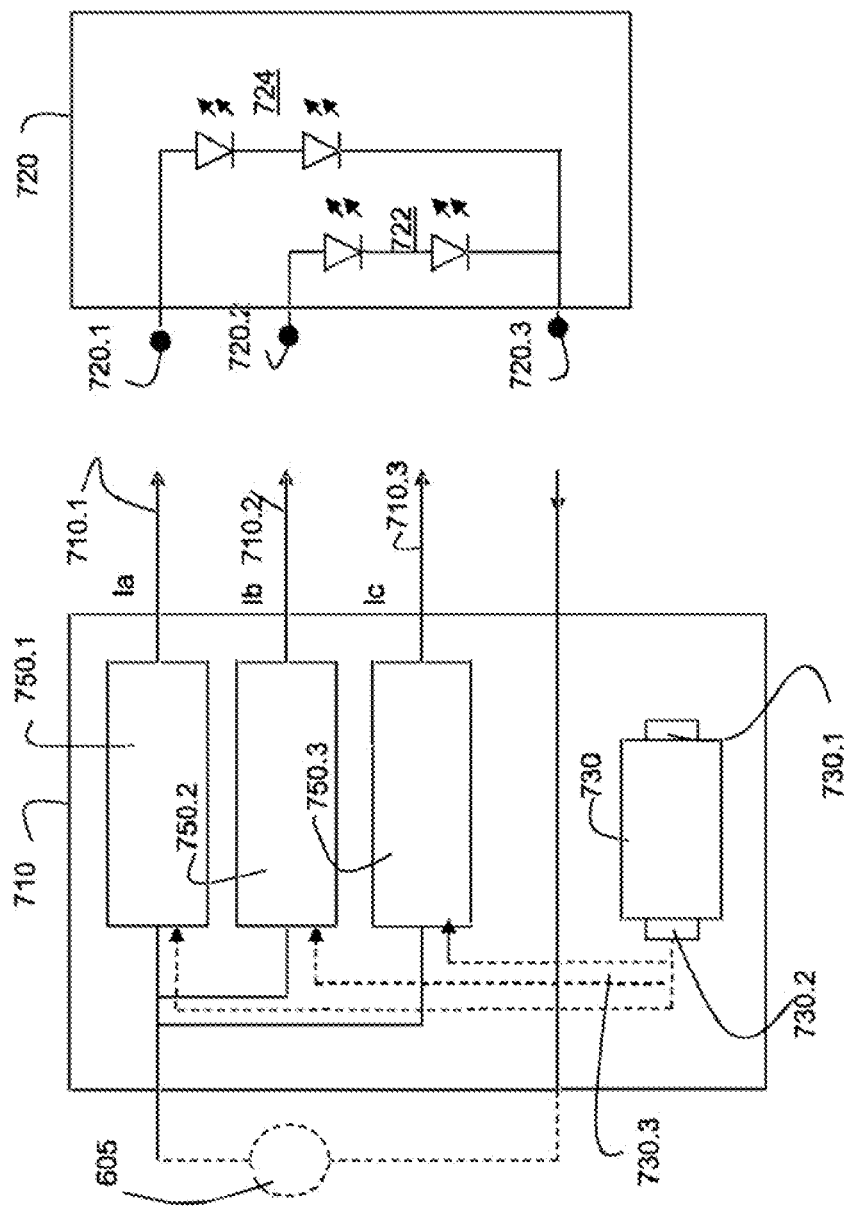
FIG. 11 schematically depicts an LED driver according an embodiment of the present invention.

Such an LED driver is schematically shown in FIG. 11. FIG. 11 schematically shows an LED driver 710 according to the present invention. The LED driver may e.g. be connected to a light engine 720 comprising two LED groups 722 and 724. In the embodiment as shown, the LED driver 710 may be configured to output three currents Ia, Ib, Ic, at respective output terminals 710.1, 710.2 and 710.3, the output currents being provided by three power converters, e.g. switched mode power converters, 750.1, 750.2 and 750.3 of the LED driver. The LED driver 710 further comprises a control unit 730 which may be configured to provide, at an output terminal 730.2, control signals 730.3 to control the power converters of the LED driver, the control signal e.g. representing the desired current profiles. The control unit 730 further comprises an input terminal 730.1 configured to receive an input signal representative of a desired illumination set-point and data that is to be transmitted via VLC. In the embodiment as shown, the output terminals 710.1, 710.2 of the LED driver 710 may be connected to the input terminals 720.1, 720.2 of the light engine 720 to power the LED groups 724 and 722. As such, in the embodiment as shown, currents Ia and Ib of the LED driver may be provided, to LED groups 722 and 724 of the light engine.

As required, detailed embodiments of the present invention are disclosed herein;

By means of the present invention, a desired illumination set-point (e.g. defined by a color and intensity set-point) can be realised, even during the application of a VLC communication. The particular application of current increments on one or more of the symbols that are to be transmitted enable an accurate realisation of a desired illumination set-point, despite limitations w.r.t. available current values or available instants to adjust the current. By realising a desired illumination set-point when considering an entire code word, rather than considering each symbol separately, an improved resolution, with respect to intensity and color is realised. The application of the one or more current increments further enables to avoid or mitigate the adverse effects of flicker to the human observer.

However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e. open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/ dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A visual light communication (VLC) method for a lighting system comprising an LED driver and a plurality of LEDs or LED groups, the method comprising the steps of:
   receiving a set-point representing a desired illumination characteristic of the plurality of LEDs or LED groups in a VLC mode, comprising an intensity set-point and a color set-point, and data that is to be transmitted in the VLC mode;
   determining a current profile for each LED or LED group of the plurality of LEDs or LED groups based on the desired illumination characteristic represented by the set-point, whereby an envelope of a combined current profile of the current profiles is configured to represent one or more code words comprising a plurality of symbols and is modulated in order for a corresponding intensity variation as perceived by a sensor to represent a variable length VLC code representing the data for transmission, the VLC code comprising the one or more code words, a code word comprising the plurality of symbols, whereby each of the plurality of symbols is characterized by both a respective predetermined period and the received set-point of the desired illumination characteristic, and whereby the current profile for each of the LED or LED groups is determined in such a manner that the illumination as generated by the plurality of LEDs or LED groups in the VLC mode corresponds to the desired illumination characteristic; and
   generating one or more control signals to drive the plurality of LEDs or LED groups in accordance with the envelope of the combined current profiles in order for the plurality of LEDs or LED groups to transmit the VLC code such that each of the plurality of symbols of the one or more code words transmitted as the data in the envelope of the combined current profiles is identified based only on the duration of the predetermined period and the intensity variation of the plurality of LEDs or LED groups corresponding to the desired illumination characteristic applied during the data transmission,
   wherein the combined current profile has a high current period and a low current period during each predetermined period, wherein each predetermined period represents a single symbol.

2. The visual light communication method according to claim 1, wherein the step of determining the current profile for each of the plurality of LEDs or LED groups comprises determining a modulated current profile for at least one LED or LED group of the plurality of LEDs or LED groups.

3. The visual light communication method according to claim 2, wherein a modulation of the combined current profile corresponds to a modulation of the modulated current profile for the at least one LED or LED group of the plurality of LEDs or LED groups.

4. The visual light communication method according to claim 2, wherein the plurality of LEDs or LED groups comprise LEDs or LED groups having a different color and the at least one LED or LED group of the plurality of LEDs or LED groups is selected based on the data.

5. The visual light communication method according to claim 1, wherein the combined current profile comprises a summation of the current profiles of the plurality of LEDs or LED groups.

6. The visual light communication method according to claim 1, wherein the data is encoded in the envelope of the combined current profile.

7. The visual light communication method according to claim 1, whereby a symbol is characterized by both the predetermined period and a color or color range.

8. The visual light communication method according to claim 7, wherein the color range comprises a plurality of distinct ranges.

9. The visual light communication method according to claim 8, wherein the distinct ranges correspond to areas in a CEI chromaticity diagram or correspond to segments of a contour in the CEI chromaticity diagram.

10. The visual light communication method according to claim 8, wherein the step of determining the current profile for each LED or LED group of the plurality of LEDs or LED groups further comprises selecting a color for transmitting a symbol of a code word of the VLC code from the plurality of distinct ranges based on a received color set point and an average color generated during a predetermined period prior to transmitting the symbol.

11. The visual light communication method according to claim 8, further comprising determining a moving average color as the average color transmitted during a predetermined previous period and selecting a color for transmitting a symbol of a code word of the VLC code from the plurality of distinct ranges based on a received color set point and the moving average color.

12. The visual light communication method according to claim 7, further comprising applying a color compensation scheme after transmitting one or more code words, based on a received color set point.

13. The visual light communication method according to claim 1, further comprising the steps of:
receiving a further set-point representing a different desired illumination characteristic,
determining a further current profile for one or more of the plurality of LEDs to generate the different desired illumination characteristic represented by the further set-point, and
determining one or more intermediate current profiles for one or more of the plurality of LEDs, and determining output control signals for the LED driver to sequentially drive the plurality of LEDs or LED groups according to:
the current profiles when transmitting a first code word;
the one or more intermediate current profiles, when transmitting a respective one or more further code words, and
the further current profiles when transmitting a yet further code word.

14. An LED driver for driving a plurality of LEDs or LED groups to transmit light in a VLC mode, wherein the LED driver comprises a control unit that is configured to perform the method according to claim 1.

15. An LED driver for driving a plurality of LEDs or LED groups to transmit light in a VLC mode, wherein the LED driver comprises a control unit that is configured to:
receive, at an input terminal, a set-point representing a desired illumination characteristic of the plurality of LEDs or LED groups, comprising an intensity set-point and a color set-point, and data that is to be transmitted in the VLC mode;
determine a current profile for each LED or LED group of the plurality of LEDs or LED groups based on the desired illumination characteristic represented by the set-point, whereby an envelope of a combined current profile of the current profiles is configured to represent one or more code words comprising a plurality of symbols and is modulated in order for a corresponding intensity variation as perceived by a sensor to represent a variable length VLC code representing the data for transmission, the VLC code comprising the one or more code words, a code word comprising the plurality of symbols, whereby each of the plurality of symbols is characterized by both a respective predetermined period and the received set-point of the desired illumination characteristic, and whereby the current profile for each of the LED or LED groups is determined in such a manner that the illumination as generated by the plurality of LEDs or LED groups in the VLC mode corresponds to the desired illumination characteristic; and
generate one or more control signals to drive the plurality of LEDs or LED groups in accordance with the envelop of the combined current profiles in order for the plurality of LEDs or LED groups to transmit the VLC code such that each of the plurality of symbols of the one or more code words transmitted as the data in the envelope of the combined current profiles is identified based only on the duration of the predetermined period and the intensity variation of the plurality of LEDs or LED groups corresponding to the desired illumination characteristic applied during the data transmission,
wherein the combined current profile has a high current period and a low current period during each predetermined period,
wherein each predetermined period represents a single symbol.

16. The LED driver according to claim 15, wherein the control unit is configured to determine a modulated current profile for at least one LED or LED group of the plurality of LEDs or LED groups.

17. The LED driver according to claim 16, wherein a modulation of the combined current profile corresponds to a modulation of the modulated current profile for the at least one LED or LED group of the plurality of LEDs or LED groups.

18. The LED driver according to claim 17, wherein the combined current profile comprises a summation of the current profiles of the plurality of LEDs or LED groups.

19. The LED driver according to claim according to claim 15, wherein the data is encoded in the envelope of the combined current profile.

20. The LED driver according to claim according to claim 15, whereby a symbol is characterized by both the predetermined period and a color or color range.

21. The LED driver according to claim according to claim 20, wherein the color range comprises a plurality of distinct ranges.

22. The LED driver according to claim according to claim 21, wherein the distinct ranges correspond to areas in a CEI chromaticity diagram or correspond to segments of a contour in the CEI chromaticity diagram.

23. The LED driver according to claim 21, whereby the step of determining the current profile for each LED or LED group of the plurality of LEDs or LED groups by the control unit further comprises selecting a color for transmitting a symbol of a code word of the VLC code from the plurality of distinct ranges based on a received color set point and an average color generated during a predetermined period prior to transmitting the symbol.

24. The LED driver according to claim according to claim 23, wherein the control unit is further configured to determine a moving average color as the average color transmitted during a predetermined previous period and to select a color for transmitting a symbol of a code word of the VLC code from the plurality of distinct ranges based on a received color set point and the moving average color.

25. The LED driver according to claim 15, wherein the control unit is further configured to receive a color set point and apply a color compensation scheme after a transmission of one or more code words, based on the received color set point.

26. The LED driver according to claim 15, wherein the control unit is further configured to:
upon receipt of a further set-point representing a different illumination characteristic during the transmission of the VLC code, determine an adjusted current profile or profiles for one or more of the plurality of LEDs or LED groups based on the different illumination characteristic, whereby the current profile is only adjusted for some, not all, symbols of a next code word to be transmitted;
generate one or more control signals to drive the plurality of LEDs or LED groups in accordance with the adjusted current profile or profiles, and
output, via an output terminal of the control unit, one or more control signals to drive the plurality of LEDs or LED groups in accordance with the adjusted current profile or profiles.

27. The LED driver according to claim 26, wherein the LED driver is configured to adjust a current for any LED of the plurality of LEDs or LED groups at a plurality of discrete values at a plurality of discrete instants.

28. The LED driver according to claim 27, wherein the LED driver is configured to adjust the current profile of only one symbol of a next code word with a minimum current increment per instant.

29. The LED driver according to claim 28, wherein each symbol is characterized by a predetermined period and at least two different intensities applied during the predetermined period.

30. A control unit for controlling an LED driver to drive a plurality of LEDs or LED groups to transmit light in a VLC mode, the control unit comprising:
an input terminal configured to receive a set-point representing a desired illumination characteristic of the plurality of LEDs or LED groups, comprising an intensity set-point and a color set-point, and data that is to be transmitted in the VLC mode; and
an output terminal configured to output one or more control signals for controlling the LED driver,
the control unit being configured to:
determine a current profile for each LED or LED group of the plurality of LEDs or LED groups to generate the desired illumination characteristic represented by the set-point, whereby an envelope of a combined current profile is configured to represent one or more code words comprising a plurality of symbols and is modulated in order for a corresponding intensity variation as perceived by a sensor to represent a variable length VLC code representing the data for transmission, the VLC code comprising the one or more code words, a code word comprising the plurality of symbols, whereby each of the plurality of symbols is characterized by both a respective predetermined period and the received set-point of the desired illumination characteristic, and whereby the current profile for each of the LED or LED groups is determined in such a manner that the illumination as generated by the plurality of LEDs or LED groups in the VLC mode corresponds to the desired illumination characteristic; and
generate one or more control signals to drive the plurality of LEDs or LED groups in accordance with the envelope of the combined current profiles in order for the plurality of LEDs or LED groups to transmit the VLC code such that each of the plurality of symbols of the one or more code words transmitted as the data in the envelope of the combined current profiles is identified based only on the duration of the predetermined period and the intensity variation of the plurality of LED or LED groups corresponding to the desired illumination characteristic applied during the transmission,
wherein the combined profile has a high current period and a low current period during each predetermined period,
wherein each predetermined period represents a single symbol.

31. The control unit according to claim 30, wherein the control unit is further configured to:
receive a further set-point representing a different desired illumination characteristic, determine a further current profile for one or more LEDs or LED groups of the plurality of LEDs to generate the different desired illumination characteristic represented by the further set-point;
determine one or more intermediate current profiles for one or more LEDs or LED groups of the plurality of LEDs or LED groups, and
determine output control signals for the LED driver to sequentially drive the plurality of LEDs or LED groups according to:
the current profiles when transmitting a first code word;
the one or more intermediate current profiles, when transmitting a respective one or more further code words, and
the further current profiles when transmitting a yet further code word.

32. The control unit according to claim 31, wherein each symbol is characterized by the predetermined period and at least two different intensities applied during the predetermined period.

33. The control unit according to claim 32, wherein each symbol is characterized by application of a comparatively high intensity during a first portion of the predetermined period, followed by application of a comparatively low intensity during a second portion of the predetermined period.

* * * * *

UNITED STATES PATENT AND TRADEMARK OFFICE
CERTIFICATE OF CORRECTION

PATENT NO. : 12,009,860 B2
APPLICATION NO. : 17/352490
DATED : June 11, 2024
INVENTOR(S) : Marc Saes and Andy Johanna Elisabeth Otten It is certified that error appears in the above-identified patent and that said Letters Patent is hereby corrected as shown below:

In the Claims

In Claim 19, Column 27, Line 1 delete "according to claim according to claim" and insert -- according to claim --.

In Claim 20, Column 27, Line 4 delete "according to claim according to claim" and insert -- according to claim --.

In Claim 21, Column 27, Line 7 delete "according to claim according to claim" and insert -- according to claim --.

In Claim 22, Column 27, Line 10 delete "according to claim according to claim" and insert -- according to claim --.

Signed and Sealed this
Third Day of December, 2024

Katherine Kelly Vidal
*Director of the United States Patent and Trademark Office*